United States Patent
Kurozumi et al.

(10) Patent No.: US 8,268,490 B2
(45) Date of Patent: Sep. 18, 2012

(54) CATALYST LAYER, MEMBRANE ELECTRODE ASSEMBLY AND FUEL CELL

(75) Inventors: Tadatoshi Kurozumi, Chiba (JP); Toshikazu Shishikura, Chiba (JP)

(73) Assignee: Showa Denko K.K., Tokyo (JP)

( * ) Notice: Subject to any disclaimer, the term of this patent is extended or adjusted under 35 U.S.C. 154(b) by 258 days.

(21) Appl. No.: 12/671,103

(22) PCT Filed: Jul. 23, 2008

(86) PCT No.: PCT/JP2008/063213
§ 371 (c)(1),
(2), (4) Date: Jan. 28, 2010

(87) PCT Pub. No.: WO2009/017010
PCT Pub. Date: Feb. 5, 2009

(65) Prior Publication Data
US 2010/0209809 A1    Aug. 19, 2010

(30) Foreign Application Priority Data
Jul. 31, 2007   (JP) .................... 2007-198854

(51) Int. Cl.
*B01J 21/06* (2006.01)
*B01J 23/20* (2006.01)
*C01G 23/04* (2006.01)
*C01G 25/02* (2006.01)
*C01G 33/00* (2006.01)
*H01M 8/10* (2006.01)

(52) U.S. Cl. .................................................. 429/400
(58) Field of Classification Search ............... 429/400, 429/483; 502/349, 350, 353
See application file for complete search history.

(56) References Cited

U.S. PATENT DOCUMENTS

| | | |
|---|---|---|
| 6,855,452 B1 * | 2/2005 | Cooper et al. ............ 429/483 |
| 2005/0147867 A1 * | 7/2005 | Cooper et al. ............ 429/40 |
| 2005/0170236 A1 * | 8/2005 | Watanabe et al. ........ 429/40 |
| 2007/0212593 A1 * | 9/2007 | Raiford et al. ........... 429/44 |

FOREIGN PATENT DOCUMENTS

| | | |
|---|---|---|
| JP | 2004-095263 A | 3/2004 |
| JP | 2005-063677 A | 3/2005 |
| JP | 2006-193392 A | 7/2006 |
| JP | 2006-299388 A | 11/2006 |

* cited by examiner

*Primary Examiner* — Timothy Vanoy
(74) *Attorney, Agent, or Firm* — Sughrue Mion, PLLC

(57) ABSTRACT

Catalyst layers include an electrocatalyst having high oxygen reduction activity that is useful as an alternative material to platinum catalysts. Uses of the catalyst layers are also disclosed. A catalyst layer of the invention includes an electrode substrate and an electrocatalyst on the surface of the electrode substrate, and the electrocatalyst is formed of a metal compound obtained by hydrolyzing a metal salt or a metal complex.

13 Claims, 17 Drawing Sheets

[Fig. 1]
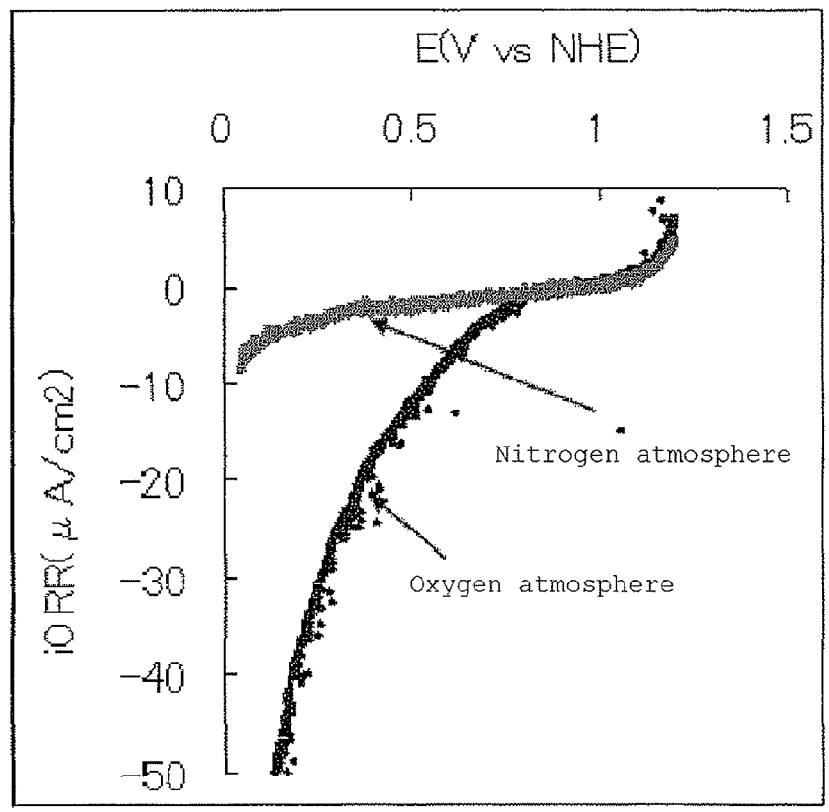
[Fig. 2]
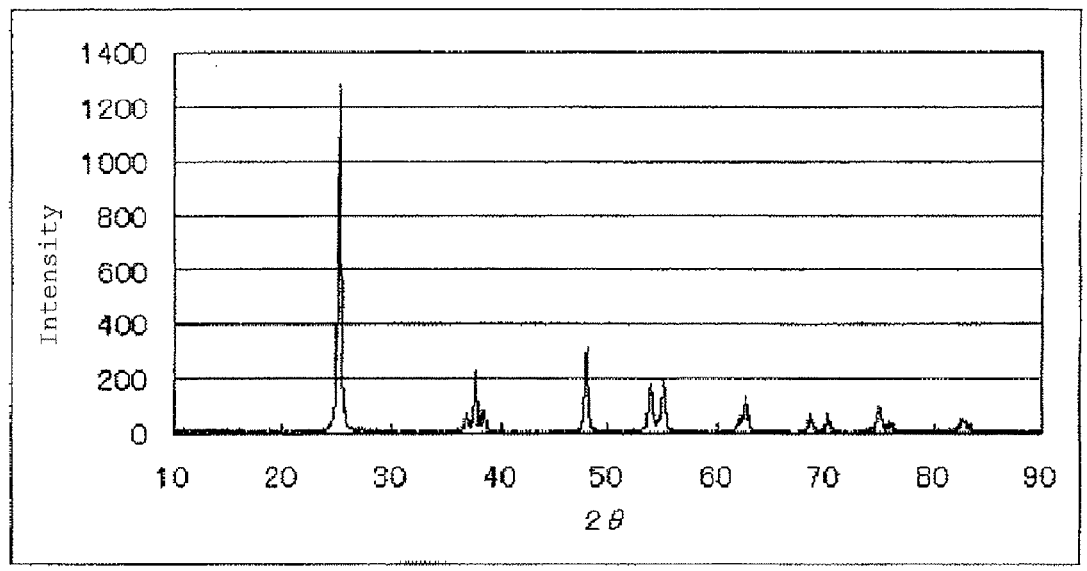

[Fig. 3]
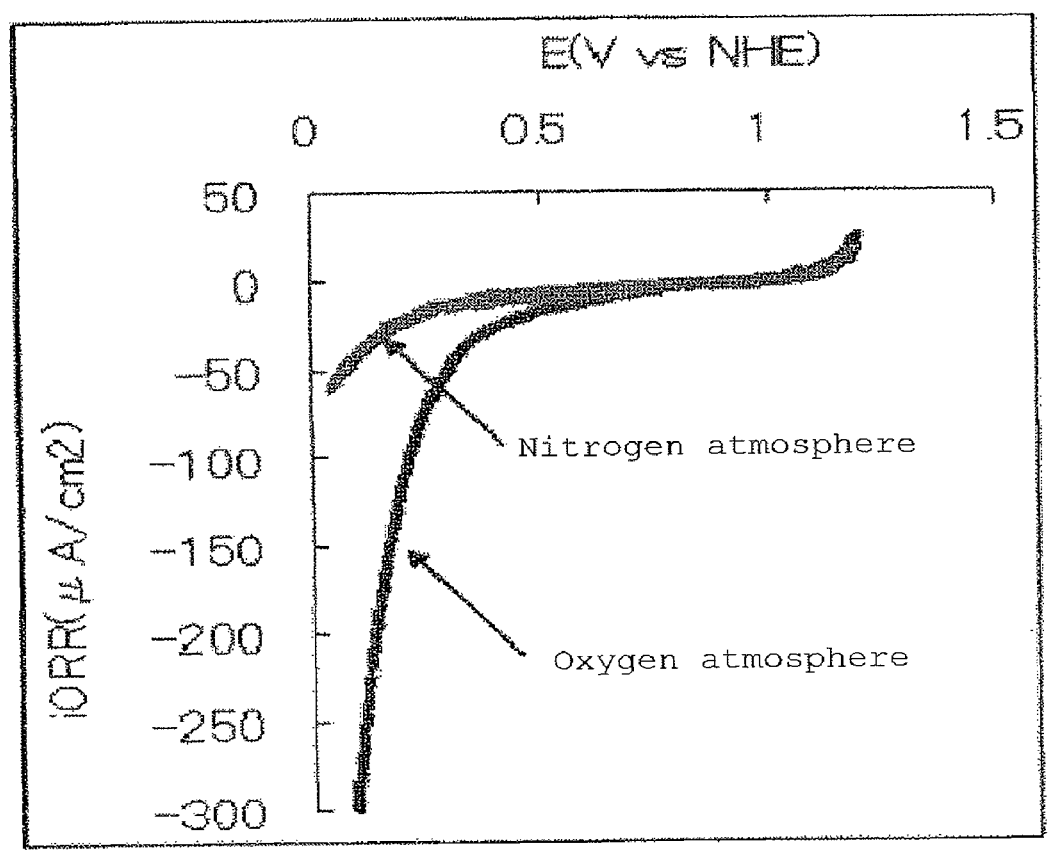

[Fig. 4]
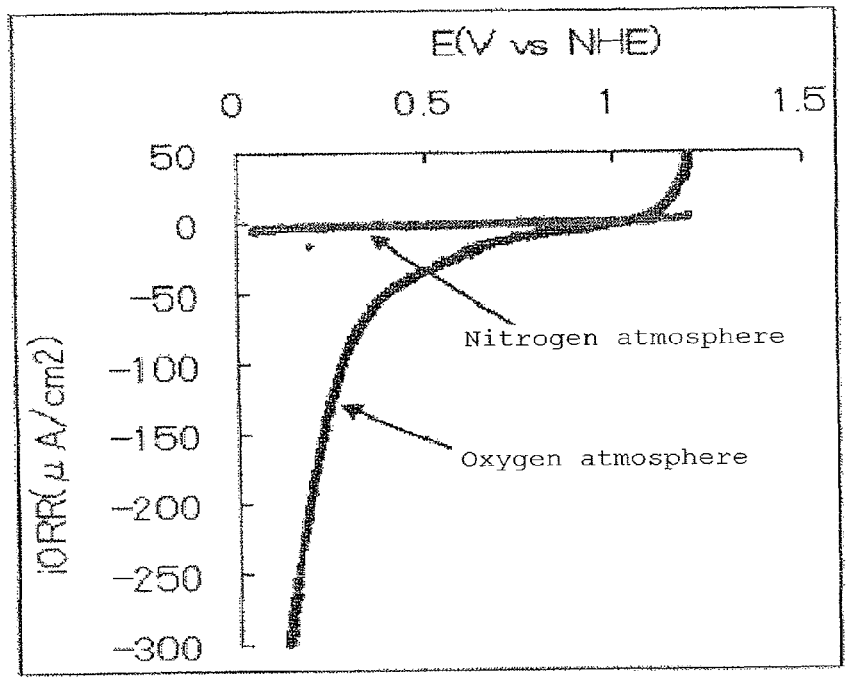
[Fig. 5]
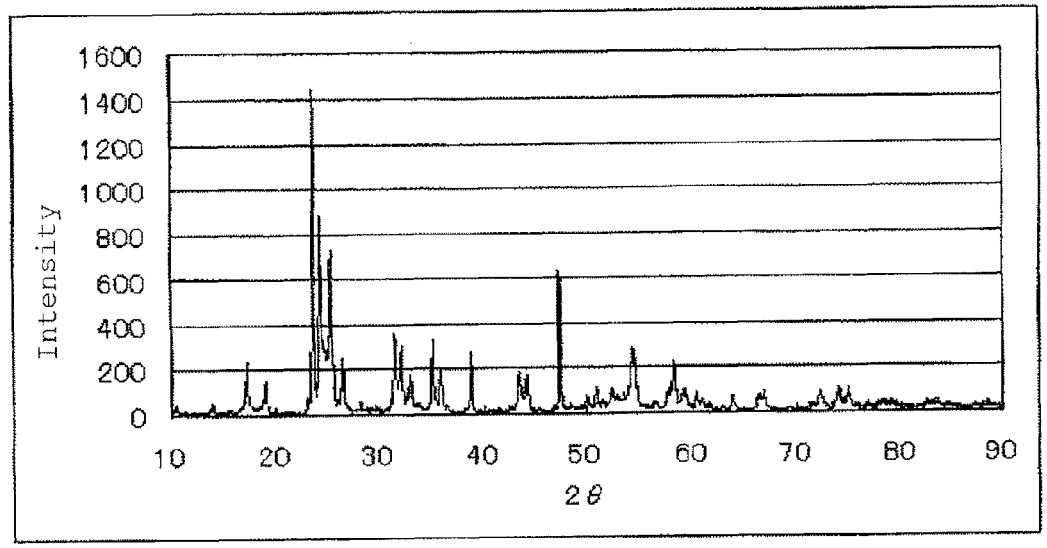

[Fig. 6]
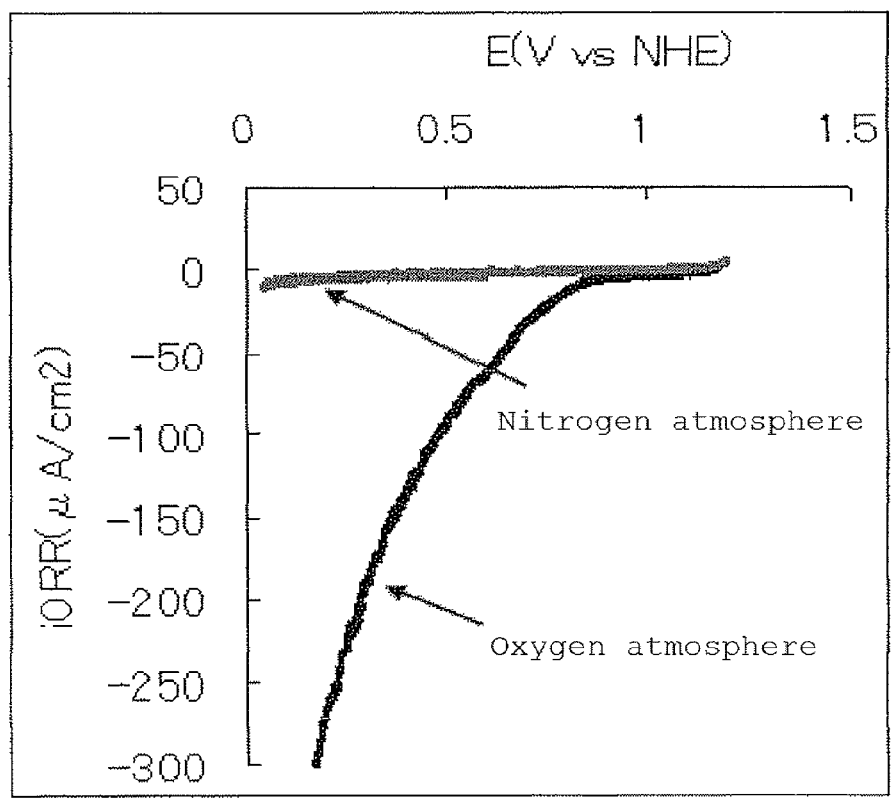
[Fig. 7]
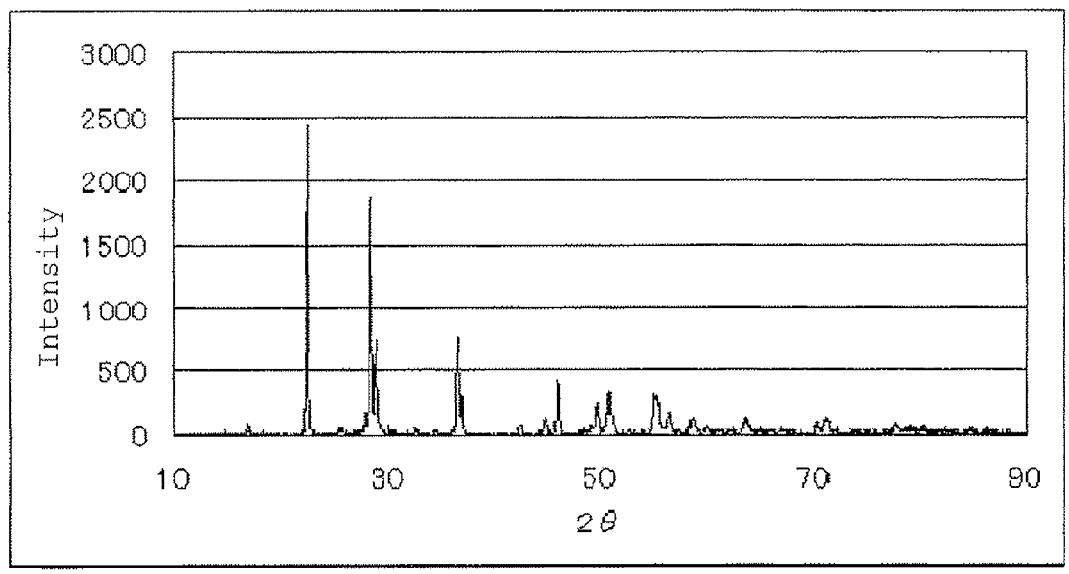

[Fig. 8]
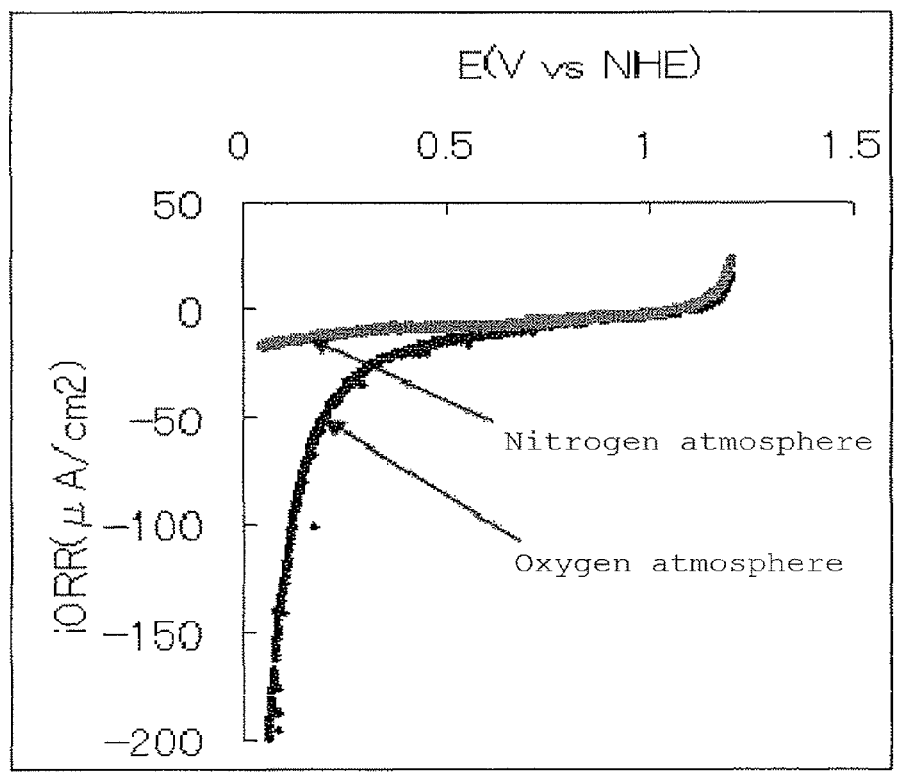
[Fig. 9]
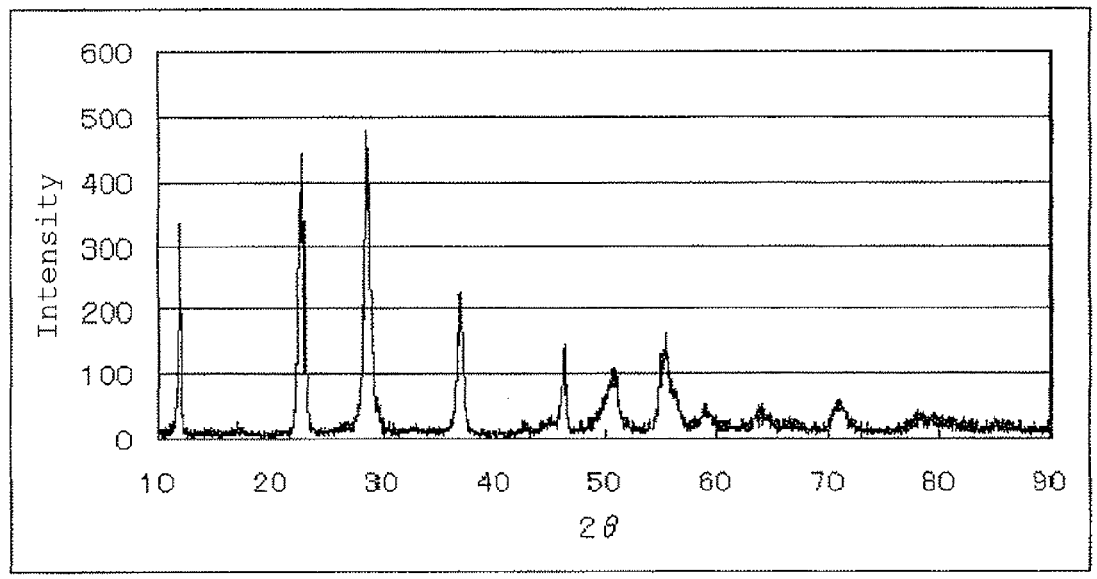

[Fig. 10]
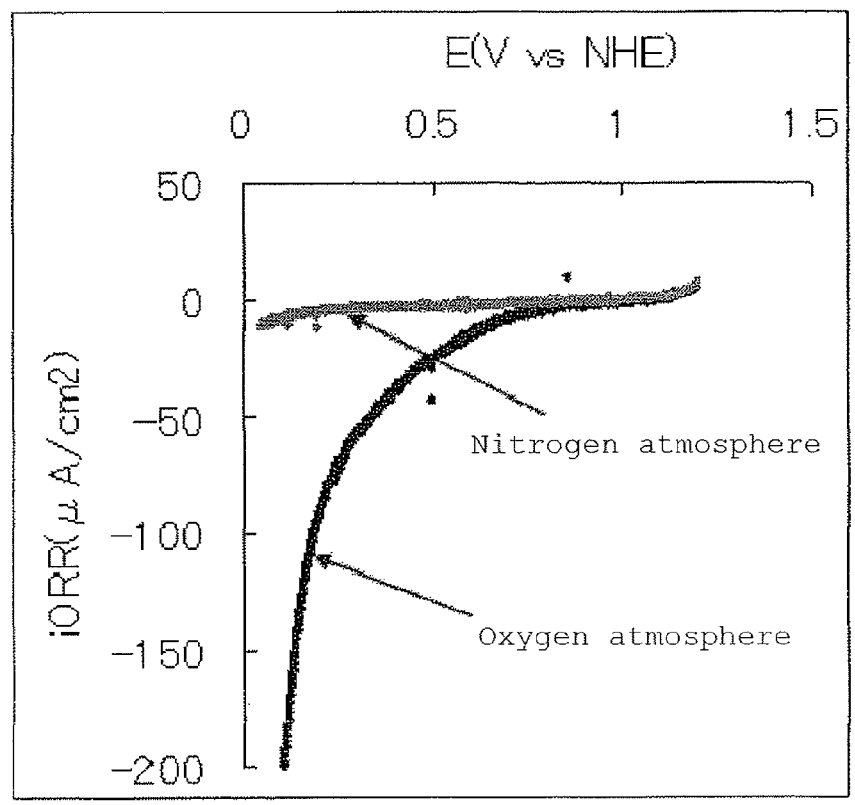
[Fig. 11]
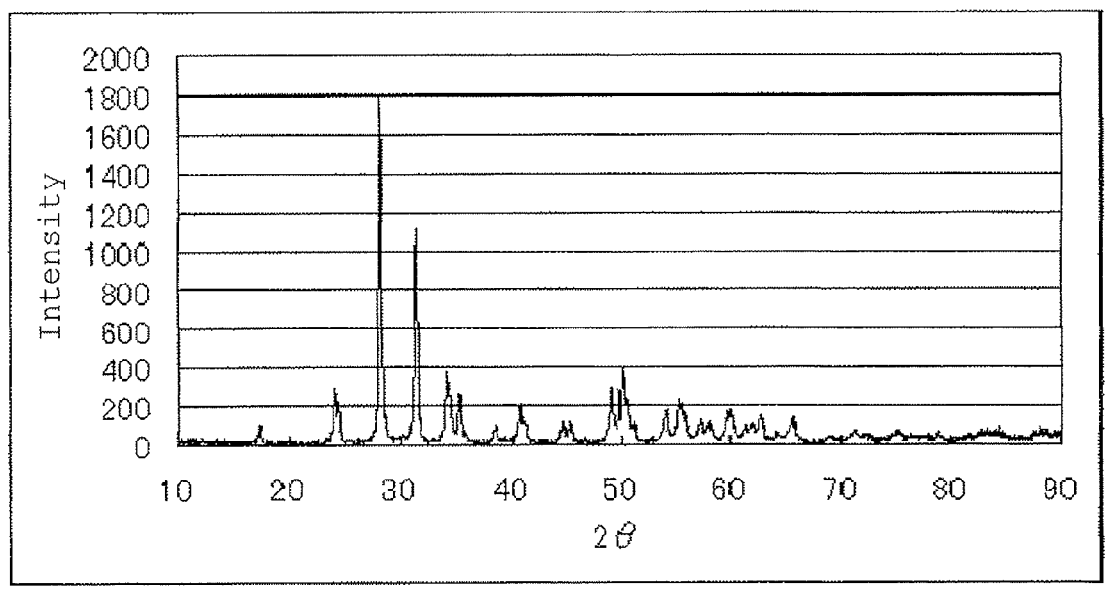

[Fig. 12]
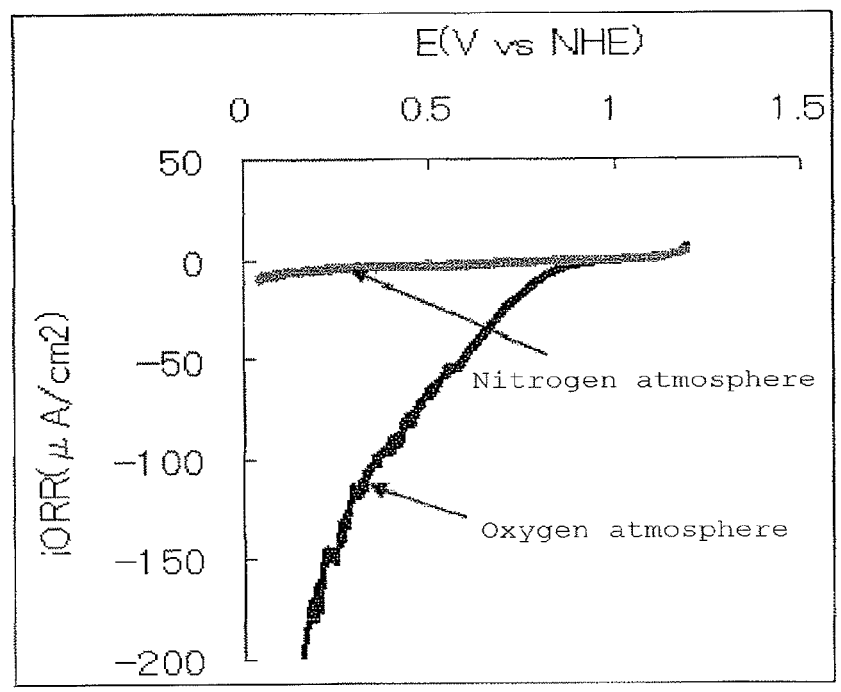
[Fig. 13]
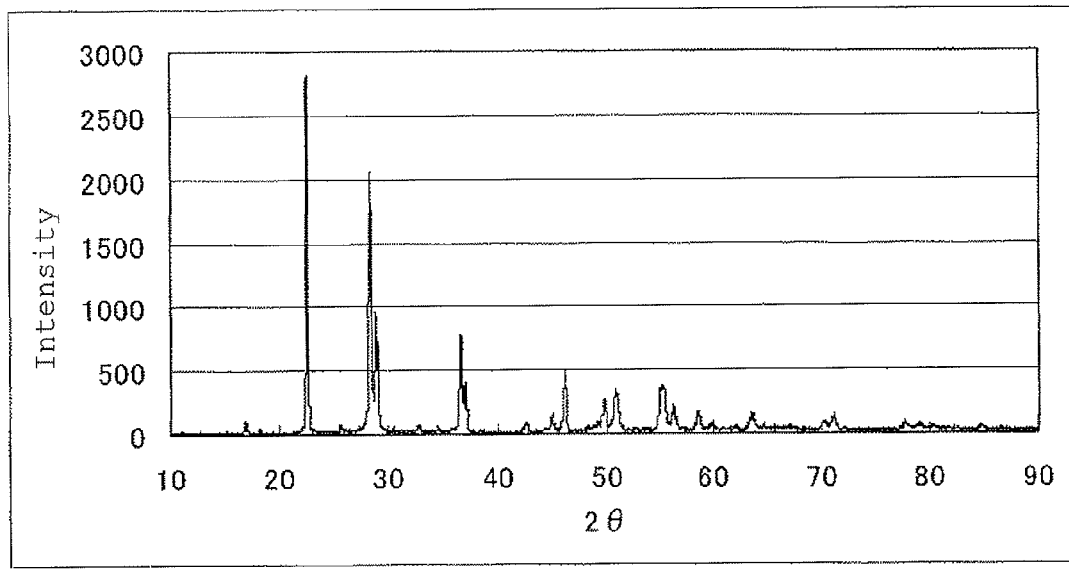

[Fig. 14]
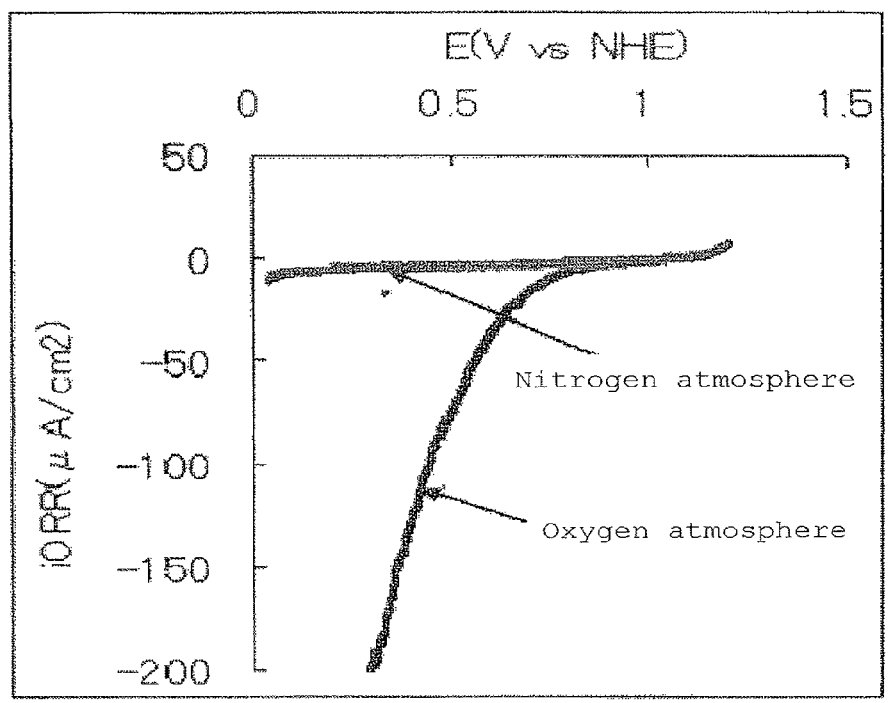
[Fig. 15]
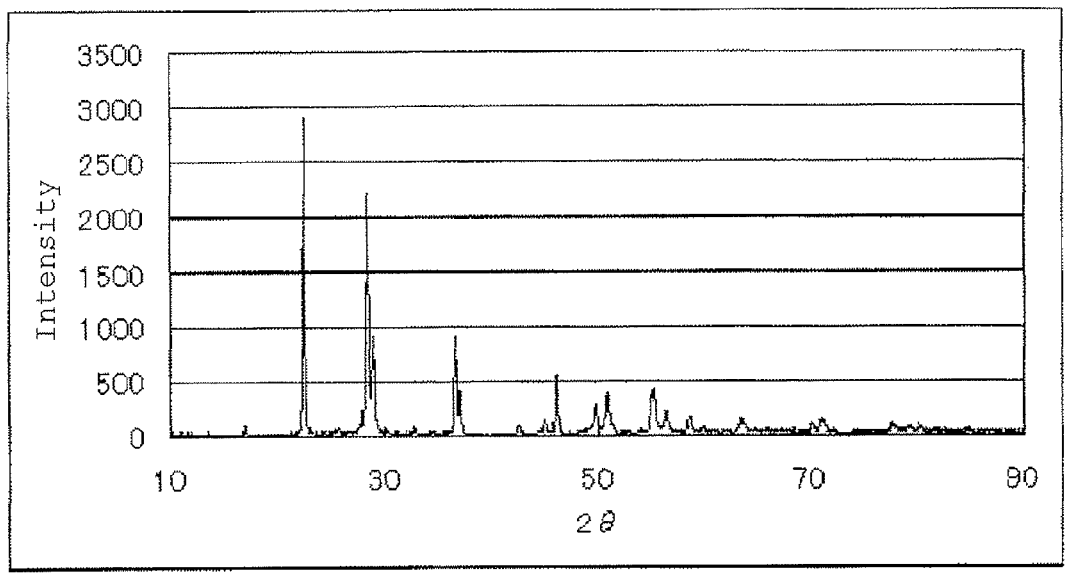

[Fig. 16]
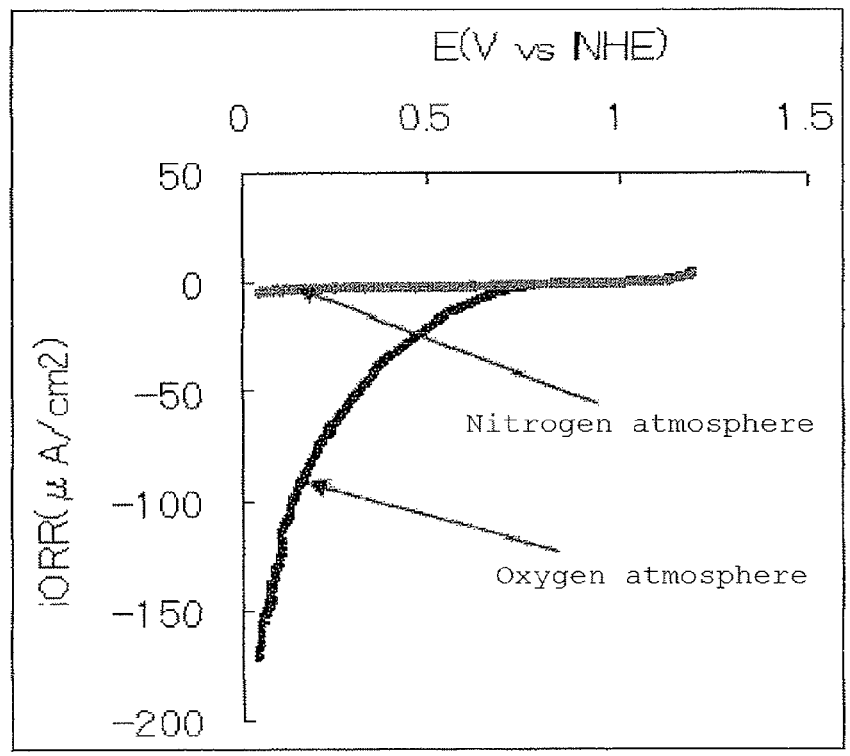
[Fig. 17]
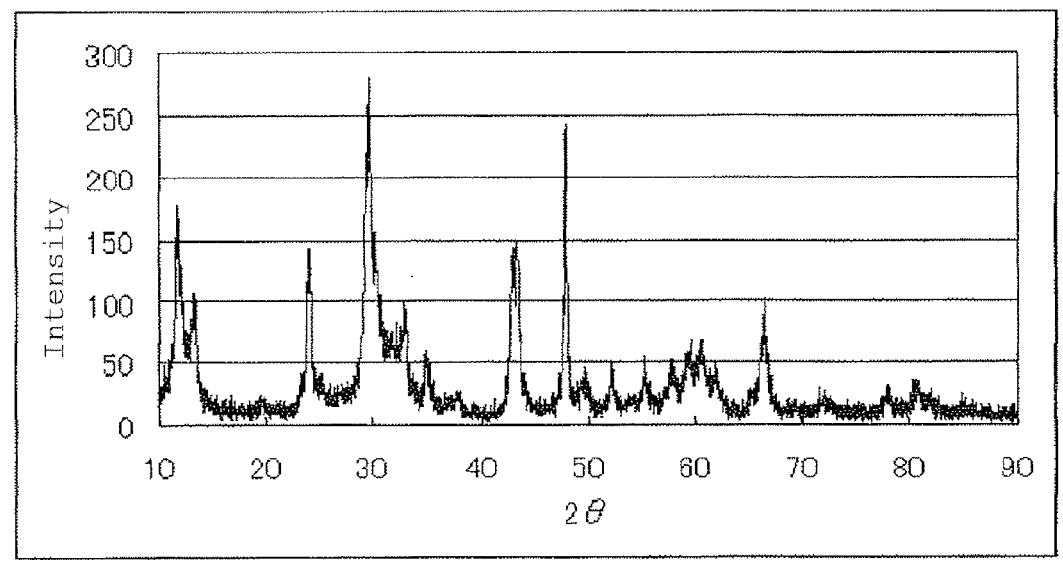

[Fig. 18]
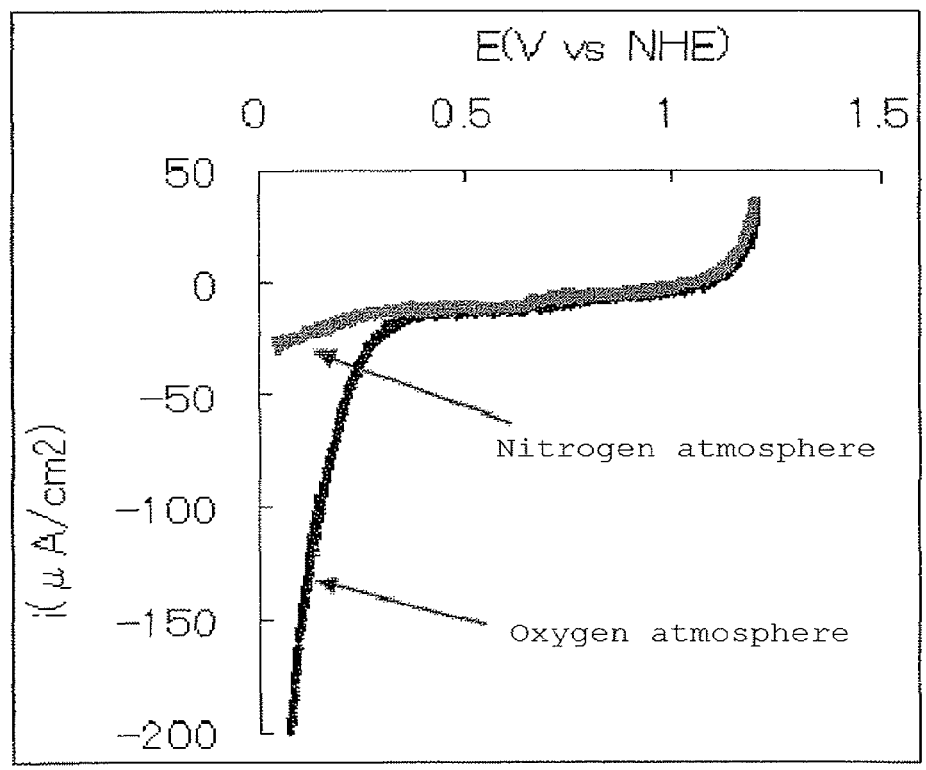
[Fig. 19]
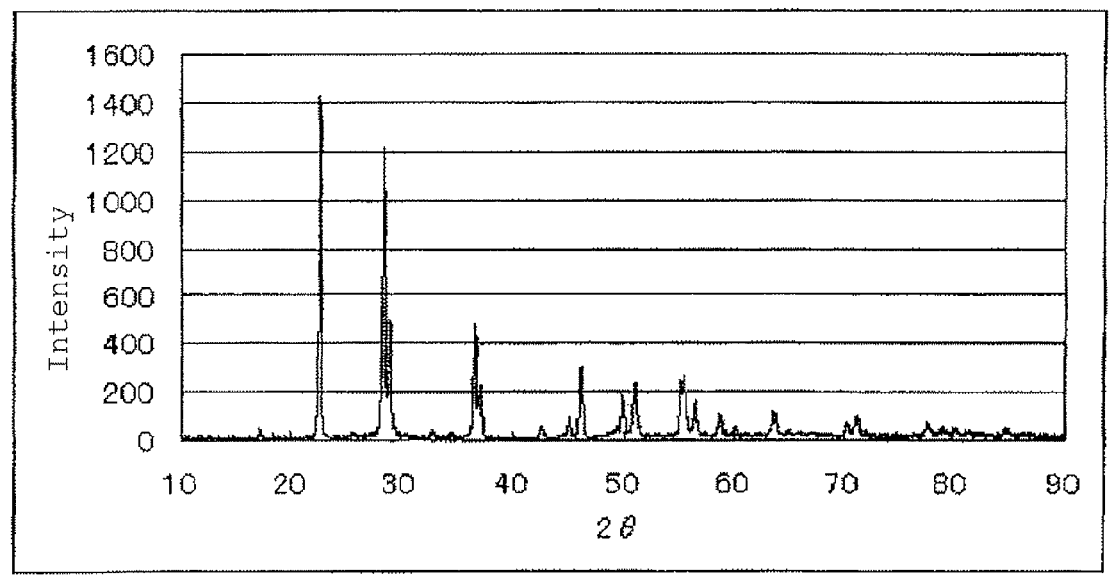

[Fig. 20]
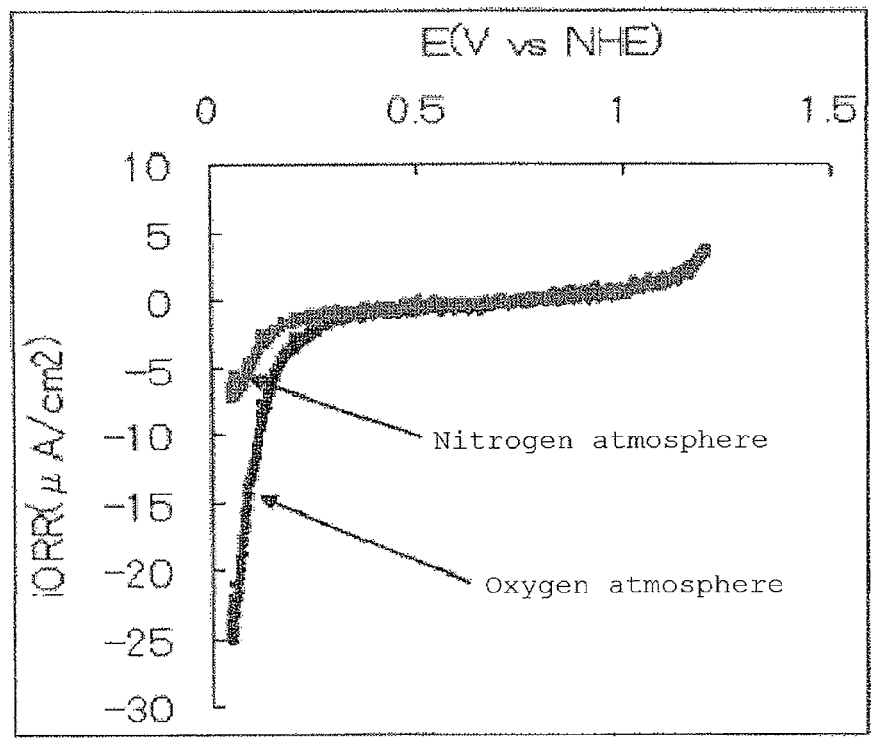
[Fig. 21]
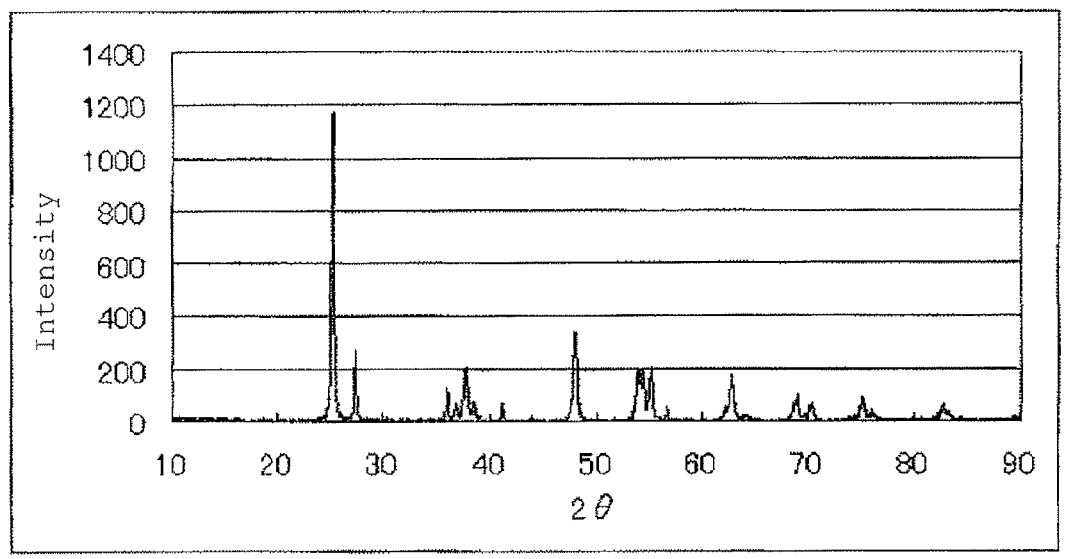

[Fig. 22]
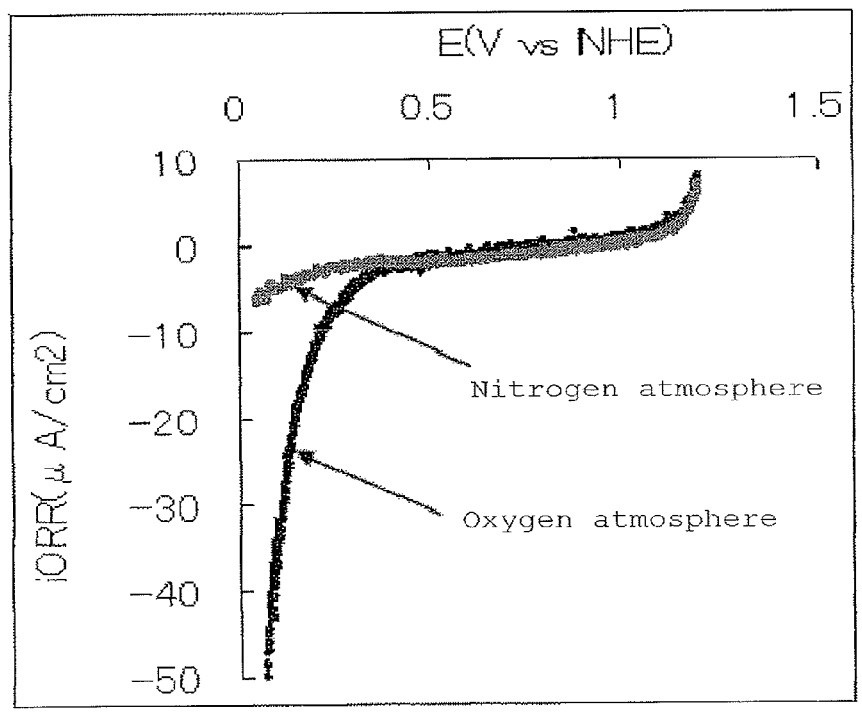
[Fig. 23]
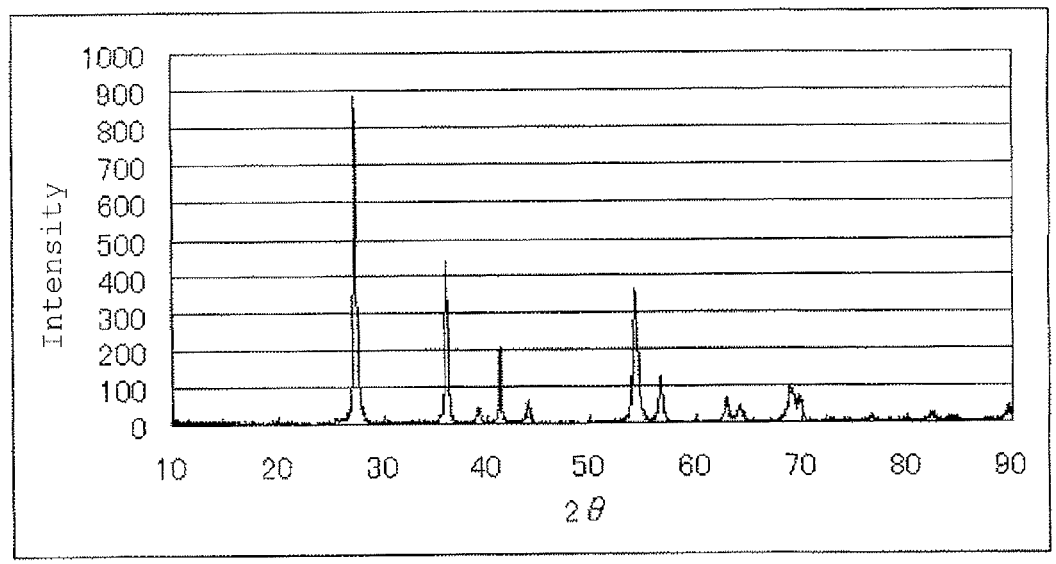

[Fig. 24]
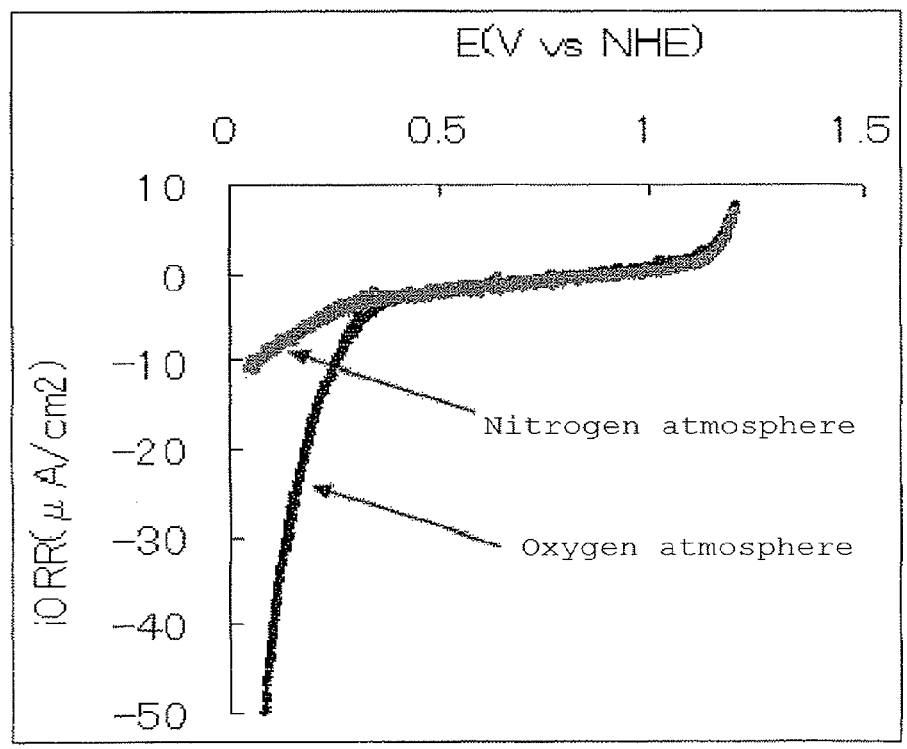
[Fig. 25]
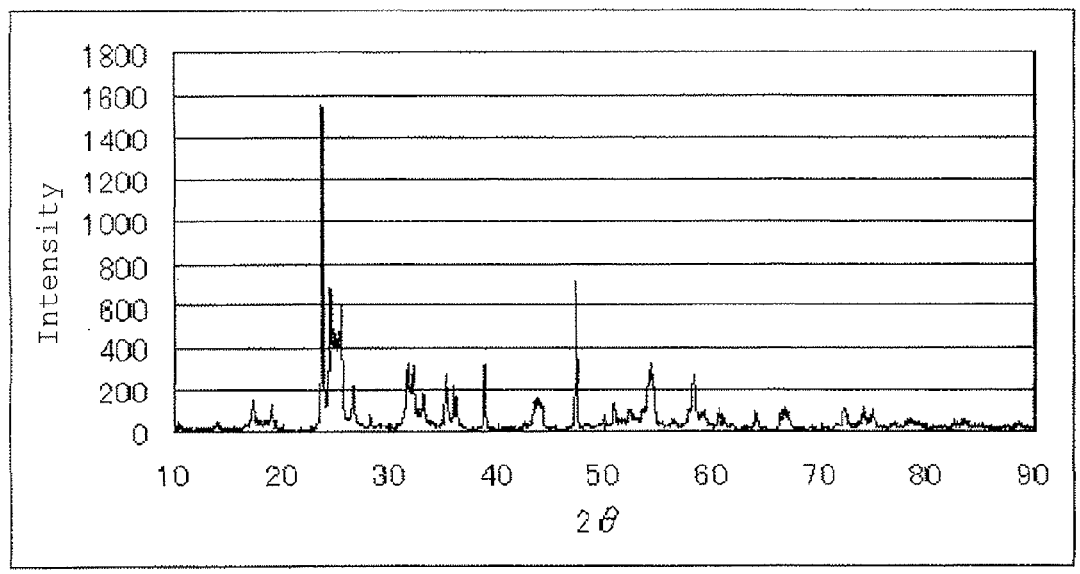

[Fig. 26]
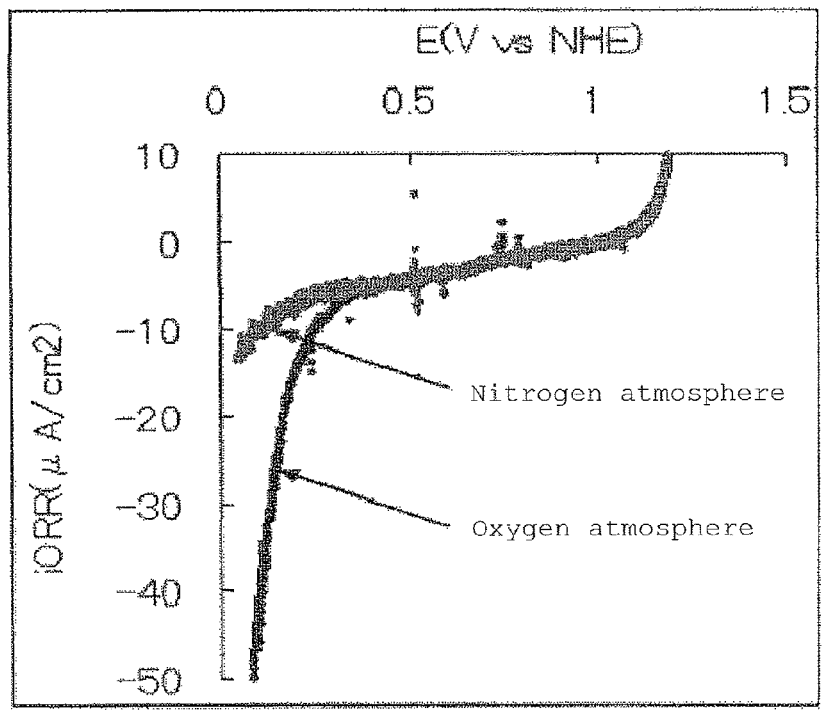
[Fig. 27]
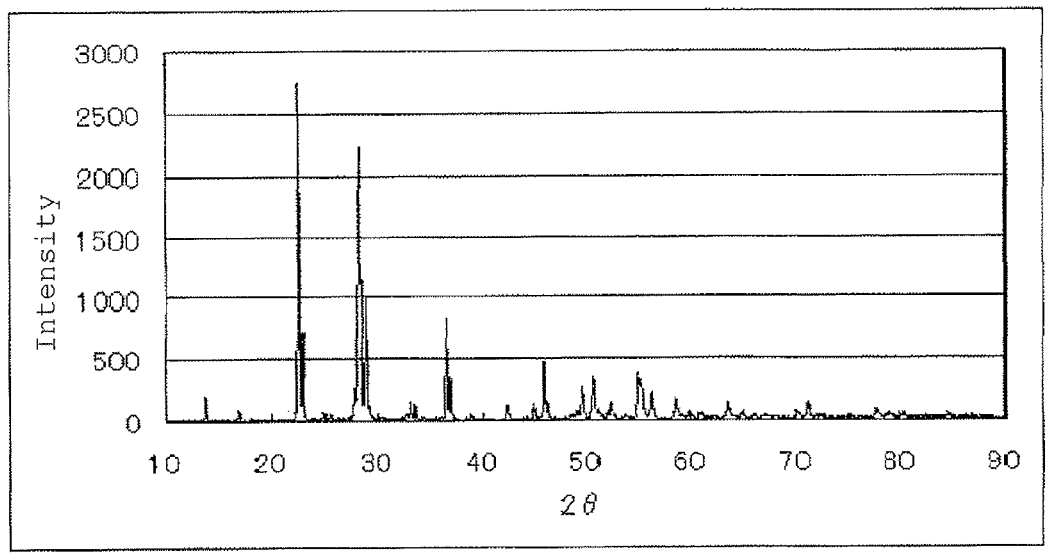

[Fig. 28]
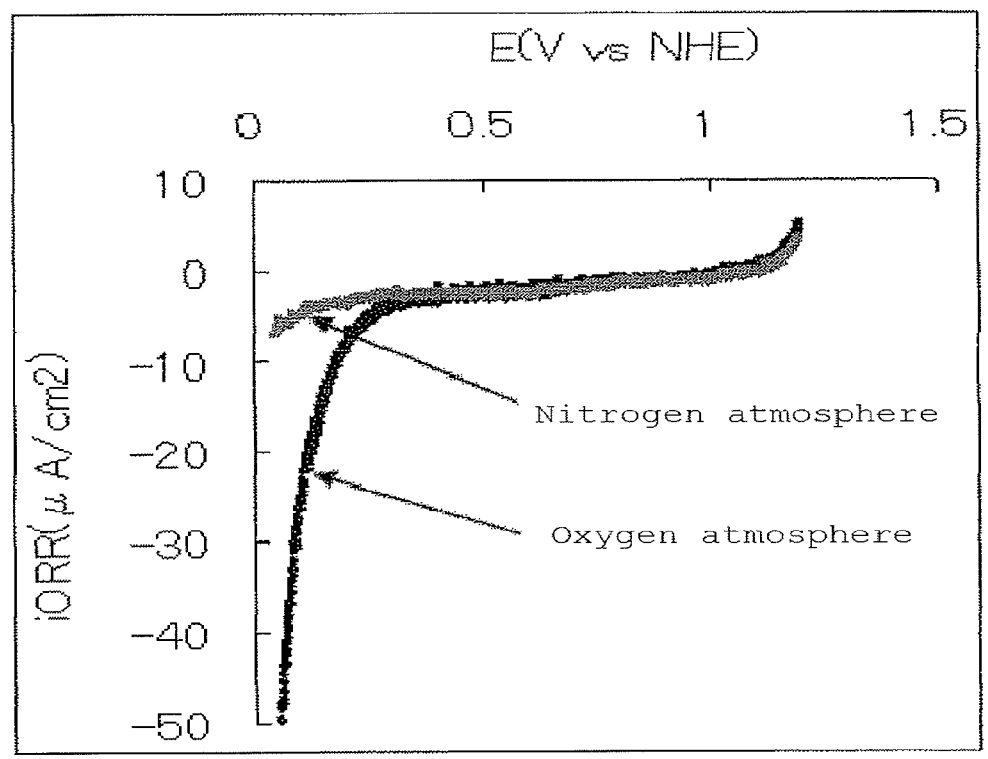
[Fig. 29]
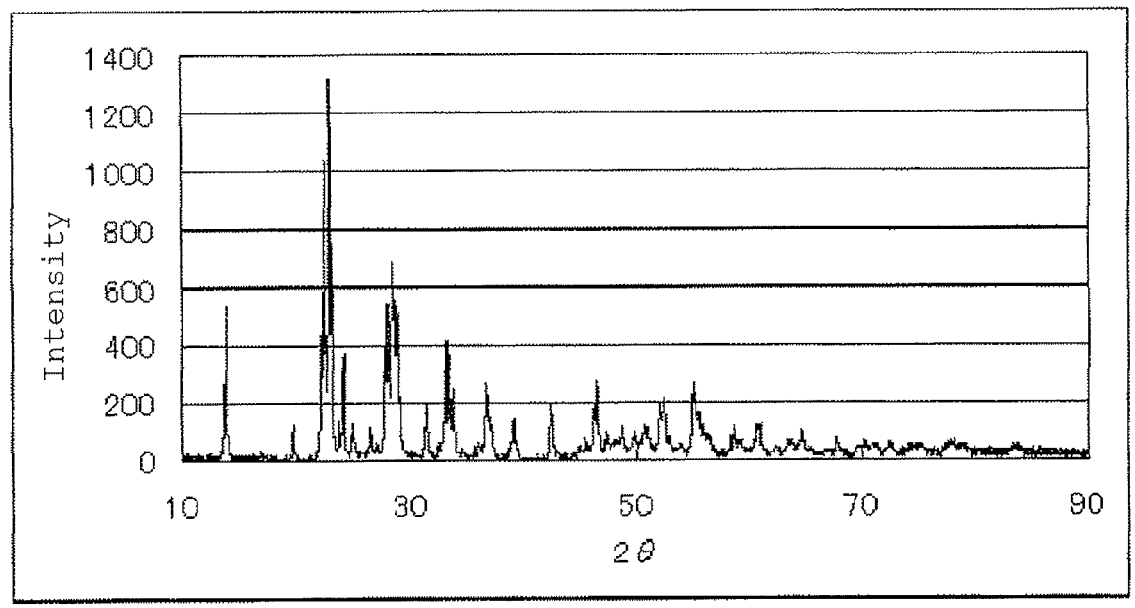

[Fig. 30]
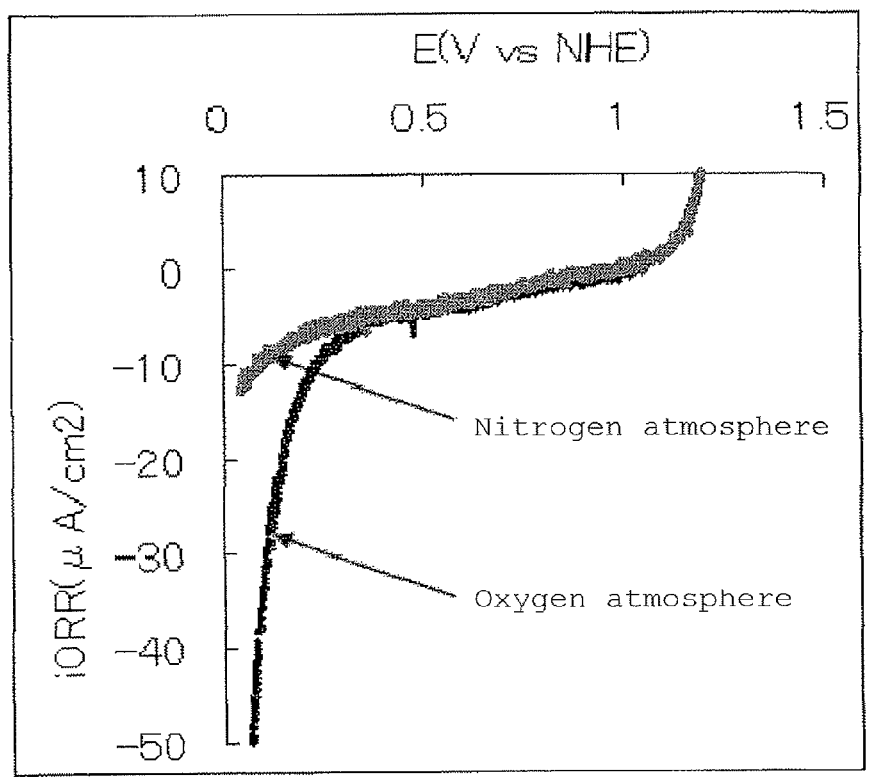
[Fig. 31]
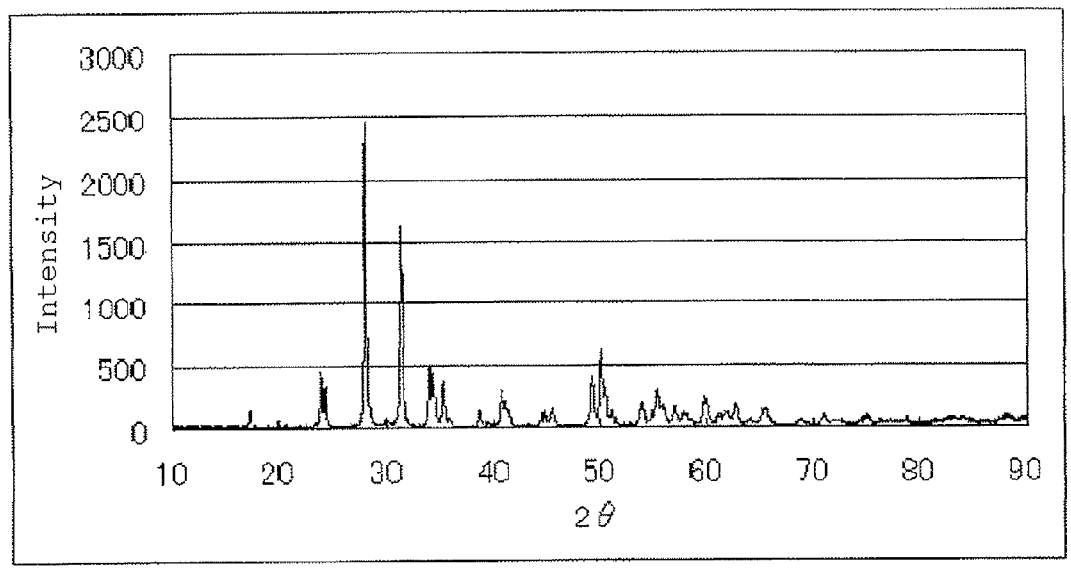

[Fig. 32]
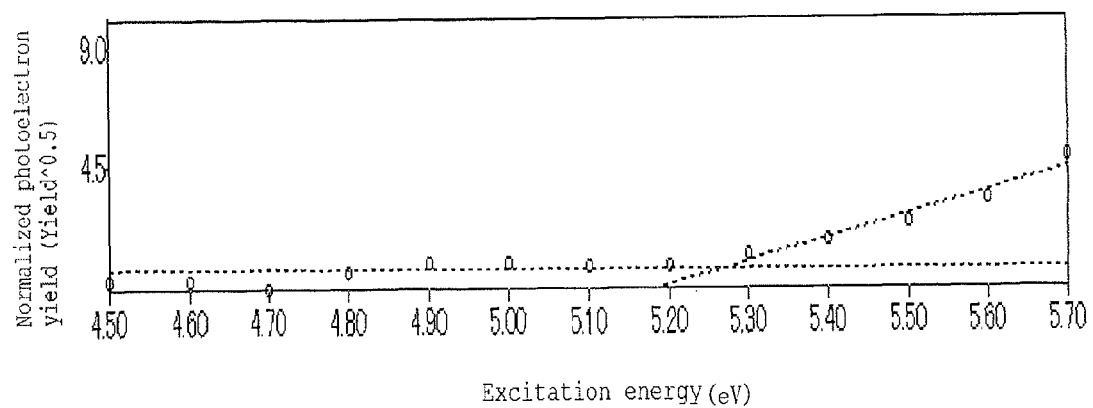

CATALYST LAYER, MEMBRANE ELECTRODE ASSEMBLY AND FUEL CELL

FIELD OF THE INVENTION

The present invention relates to catalyst layers, membrane electrode assemblies and fuel cells.

BACKGROUND OF THE INVENTION

In fuel cells, a layer containing a catalyst for electrode (hereinafter, also the electrocatalyst) is usually provided on the surface of a cathode (air electrode) or an anode (fuel electrode). (Such layers are also referred to as the catalyst layers hereinafter.)

Typical electrocatalysts for fuel cells are platinum catalysts that are stable at high potential and have high catalytic activity. However, since platinum is expensive and exists in a limited amount, alternative catalysts have been desired.

Metal oxide electrocatalysts attract attention as cathode catalysts alternative to the platinum catalysts. Metal oxides are generally stable and are not corroded in acidic electrolytes or at high potential. Further, metal oxide catalyst layers formed on the surface of electrodes stabilize the structure of the electrodes.

For example, Patent Document 1 (JP-A-2004-95263) discloses fuel cell catalysts containing a metal oxide such as $WO_3$, $TiO_2$, $ZrO_2$, $PtO$, $Sb_2O_4$ or $Sb_2O_3$ as electrocatalysts. However, the fuel cell catalysts also involve platinum and still have the problems as described above.

Patent Document 2 (JP-A-2005-63677) discloses fuel cells that have an electrocatalyst selected from ruthenium oxide, titanium oxide, vanadium oxide, manganese oxide, cobalt oxide, nickel oxide and tungsten oxide. However, these metal oxides as electrocatalysts show low oxygen reduction activity.

Patent Document 1: JP-A-2004-95263
Patent Document 2: JP-A-2005-63677

DISCLOSURE OF THE INVENTION

The present invention is aimed at solving the problems in the background art as described above. It is therefore an object of the invention to provide catalyst layers containing an electrocatalyst with high oxygen reduction activity, membrane electrode assemblies including such layers, and fuel cells having the membrane electrode assemblies.

The present inventors studied diligently to solve the problems in the art as above. They have then found that electrocatalysts that are formed of metal compounds obtained by a specific method show high oxygen reduction activity and are suitably used in catalyst layers. The present invention has been completed based on the finding.

The present invention is concerned with the following (1) to (14).

(1) A catalyst layer comprising an electrocatalyst, the electrocatalyst comprising a metal compound obtained by hydrolyzing a metal salt or a metal complex.

(2) The catalyst layer described in (1) above, wherein the metal element forming the electrocatalyst is one selected from the group consisting of niobium, titanium, tantalum and zirconium.

(3) The catalyst layer described in (1) above, wherein the metal element forming the electrocatalyst is niobium or titanium.

(4) The catalyst layer described in any one of (1) to (3) above, wherein the electrocatalyst is powder.

(5) The catalyst layer described in anyone of (1) to (4) above, wherein the metal salt is one selected from the group consisting of metal alkoxides, metal carboxylates and metal halides.

(6) The catalyst layer described in anyone of (1) to (5) above, wherein the electrocatalyst has a BET specific surface area in the range of 1 to 1000 $m^2/g$.

(7) The catalyst layer described in any one of (1) to (6) above, wherein the electrocatalyst has an ionization potential in the range of 4.9 to 5.5 eV.

(8) The catalyst layer described in any one of (1) to (7) above, wherein the electrocatalyst is obtained by crushing the metal compound.

(9) The catalyst layer described in any one of (1) to (8) above, wherein the electrocatalyst is obtained by heat treating the metal compound.

(10) The catalyst layer described in (9) above, wherein the heat treatment temperature in the heat treatment is in the range of 400 to 1200° C.

(11) The catalyst layer described in any one of (1) to (10) above, which further comprises electron conductive particles.

(12) A membrane electrode assembly comprising a cathode, an anode and an electrolyte membrane arranged between the cathode and the anode, wherein the cathode has the catalyst layer described in any one of (1) to (11) above.

(13) A fuel cell comprising the membrane electrode assembly described in (12) above.

(14) The fuel cell described in (13) above, which is a polymer electrolyte fuel cell.

ADVANTAGEOUS EFFECTS OF THE INVENTION

The catalyst layers according to the invention contain the specific electrocatalysts. The electrocatalysts show high oxygen reduction activity and are stable and resistant to corrosion in acidic electrolytes at high potential.

BRIEF DESCRIPTION OF THE DRAWINGS

FIG. 1 is a graph showing an evaluation of the oxygen reduction activity of a fuel cell electrode (1) in Example 1.

FIG. 2 is an XRD spectrum of an electrocatalyst (1) of Example 1.

FIG. 3 is a graph showing an evaluation of the oxygen reduction activity of a fuel cell electrode (2) in Example 2.

FIG. 4 is a graph showing an evaluation of the oxygen reduction activity of a fuel cell electrode (3) in Example 3.

FIG. 5 is an XRD spectrum of an electrocatalyst (3) of Example 3.

FIG. 6 is a graph showing an evaluation of the oxygen reduction activity of a fuel cell electrode (4) in Example 4.

FIG. 7 is an XRD spectrum of an electrocatalyst (4) of Example 4.

FIG. 8 is a graph showing an evaluation of the oxygen reduction activity of a fuel cell electrode (5) in Example 5.

FIG. 9 is an XRD spectrum of an electrocatalyst (5) of Example 5.

FIG. 10 is a graph showing an evaluation of the oxygen reduction activity of a fuel cell electrode (6) in Example 6.

FIG. 11 is an XRD spectrum of an electrocatalyst (6) of Example 6.

FIG. 12 is a graph showing an evaluation of the oxygen reduction activity of a fuel cell electrode (7) in Example 7.

FIG. 13 is an XRD spectrum of an electrocatalyst (7) of Example 7.

FIG. 14 is a graph showing an evaluation of the oxygen reduction activity of a fuel cell electrode (8) in Example 8.

FIG. 15 is an XRD spectrum of an electrocatalyst (8) of Example 8.

FIG. 16 is a graph showing an evaluation of the oxygen reduction activity of a fuel cell electrode (9) in Example 9.

FIG. 17 is an XRD spectrum of an electrocatalyst (9) of Example 9.

FIG. 18 is a graph showing an evaluation of the oxygen reduction activity of a fuel cell electrode in Comparative Example 1.

FIG. 19 is an XRD spectrum of an electrocatalyst of Comparative Example 1.

FIG. 20 is a graph showing an evaluation of the oxygen reduction activity of a fuel cell electrode in Comparative Example 2.

FIG. 21 is an XRD spectrum of an electrocatalyst of Comparative Example 2.

FIG. 22 is a graph showing an evaluation of the oxygen reduction activity of a fuel cell electrode in Comparative Example 3.

FIG. 23 is an XRD spectrum of an electrocatalyst of Comparative Example 3.

FIG. 24 is a graph showing an evaluation of the oxygen reduction activity of a fuel cell electrode in Comparative Example 4.

FIG. 25 is an XRD spectrum of an electrocatalyst of Comparative Example 4.

FIG. 26 is a graph showing an evaluation of the oxygen reduction activity of a fuel cell electrode in Comparative Example 5.

FIG. 27 is an XRD spectrum of an electrocatalyst of Comparative Example 5.

FIG. 28 is a graph showing an evaluation of the oxygen reduction activity of a fuel cell electrode in Comparative Example 6.

FIG. 29 is an XRD spectrum of an electrocatalyst of Comparative Example 6.

FIG. 30 is a graph showing an evaluation of the oxygen reduction activity of a fuel cell electrode in Comparative Example 7.

FIG. 31 is an XRD spectrum of an electrocatalyst of Comparative Example 7.

FIG. 32 is a graph showing the ionization potential of the electrocatalyst (1) of Example 1.

PREFERRED EMBODIMENTS FOR CARRYING OUT THE INVENTION

Catalyst Layers

The catalyst layers of the invention contain an electrocatalyst that is formed of a metal compound obtained by hydrolyzing a metal salt or a metal complex.

The metal element forming the electrocatalyst is preferably a transition metal that easily shows a catalytic activity. Of the transition metals, Group IVa and Group Va transition metals that are electrochemically stable in acidic electrolytes are preferable, and a transition metal element selected from the group consisting of niobium, titanium, tantalum and zirconium is more preferable. In particular, niobium and titanium are preferable because of high availability.

Examples of the metal salts and the metal complexes include metal alkoxides, metal carboxylates, metal halides and metal acetylacetonate complexes. In particular, it is preferable to use at least one metal salt selected from metal alkoxides, metal carboxylates and metal halides because these metal salts are inexpensive and are easily hydrolyzable.

Preferred metal alkoxides include lower alkoxides such as ethoxides, propoxides, isopropoxides, butoxides and isobutoxides. Preferred metal carboxylates include lower fatty acid salts such as acetates and propionates. Preferred metal halides include chlorides.

The metal compounds obtained by hydrolyzing the metal salts or the metal complexes are usually metal oxides having a hydroxyl group on the surface of particles. The material-derived alkoxyl groups or carboxylic acid groups may remain therein.

Generally, hydrolysis tends to produce particles containing water therein and having surface defects. The present inventors assume that the metal compounds obtained by hydrolyzing the metal salts or the metal complexes have defects (oxygen defects) on the surface and consequently the electrocatalysts formed of the metal compounds show high oxygen reduction activity.

(Metal Compounds)

The metal compounds used in the invention are obtained by hydrolyzing metal salts or metal complexes.

The metal salts and the metal complexes are as described hereinabove.

The metal salts and the metal complexes may be hydrolyzed by known methods without limitation. The metal compounds obtained by hydrolysis in the invention are usually metal oxides having a hydroxyl group on the surface of particles. The surface defects of the metal oxides may be increased by controlling the reaction conditions appropriately.

For example, the metal alkoxides as raw materials may be dissolved in solvents and hydrolyzed by adding water thereto. The metal carboxylates as raw materials may be hydrolyzed by addition of alkaline water. Water and alkali may be added by methods such as dropping and pumping. In a preferred embodiment, they may be added in small portions and the obtainable metal compound achieves a larger specific surface area.

The reaction is usually carried out with stirring. Stirring permits the hydrolysis reaction to proceed homogeneously, and a metal compound may be obtained in a powdery form with little aggregation.

The reaction may be performed at room temperature or under cooling or heating. Heating will increase the crystallinity of the obtainable metal compound and tends to give a metal oxide having surface defects as a result of the release of the hydroxyl groups. Cooling permits homogeneous reaction and tends to give a metal compound having a larger specific surface area.

A longer reaction time is preferable because the crystallinity of the obtainable metal compound is increased. However, an excessively long reaction time is not industrially favorable. Preferably, the reaction time may range from 10 minutes to 24 hours, more preferably from 30 minutes to 12 hours, and still more preferably from 1 to 8 hours.

When the metal alkoxides or the metal carboxylates are used as raw materials, the obtainable metal compounds may have material-derived alkoxyl groups or carboxylic acid groups remaining on the surface of particles depending on the reaction conditions. Such material-derived alkoxyl groups or carboxylic acid groups may be removed by increasing the reaction temperature and the reaction time or by performing a drying treatment or a heat treatment as will be described later.

The metal compounds obtained as described above are usually in the form of slurry. The slurry may be subjected to solid-liquid separation to isolate the metal compound.

The solid-liquid separation may include steps such as particle sedimentation, concentration, filtration, washing and drying. All these steps are not necessarily performed, and necessary steps vary depending on slurry properties or the like. Impurities dissolved in the liquid may be removed through the sedimentation, concentration, filtration and washing. Flocculants or dispersants may be used to control the sedimentation rate or the filtration rate. The flocculants or dispersants are preferably removable by gasification through evaporation, sublimation, thermal decomposition or the like. The filtering and washing remove the solvents and by-products of the hydrolysis of the metal salts or the metal complexes that are dissolved in the solvents.

The drying step causes the solvent to evaporate. Depending on the drying temperature, the hydroxyl groups on the surface of particles may be released by the drying and thereby metal compounds having more surface defects may be obtained. Depending on the types of the by-products in the hydrolysis of the metal salts or the metal complexes, it is possible that the drying further removes part or all the impurities as well as the material-derived alkoxyl groups or carboxylic acid groups through evaporation, sublimation, thermal decomposition or the like. The drying methods include vacuum drying, hot air drying and freeze drying. The drying is usually carried out at room temperature to 400° C. for 1 to 24 hours. The drying atmosphere is not particularly limited, but is usually an air atmosphere, an inert gas atmosphere or a reduced pressure atmosphere. To release the hydroxyl groups on the surface of particles and obtain metal oxides having more surface defects, the drying is preferably carried out at temperatures not less than 100° C., and more preferably not less than 200° C.

(Electrocatalysts)

The electrocatalysts in the invention are formed of metal compounds obtained by hydrolyzing metal salts or metal complexes. For example, the metal compounds as described hereinabove may be used directly or after heat treatment, crushing, or both heat treatment and subsequent crushing.

The electrocatalysts are preferably in the form of powder. Powdery electrocatalysts have an increased area and achieve a higher catalytic activity.

In a preferred embodiment, the metal compound is crushed. By the crushing, the electrocatalyst is broken into finer particles and such fine electrocatalyst can be favorably dispersed in the catalyst layer.

The methods for crushing the metal compounds include roll milling, ball milling, medium stirring milling, and crushing with an air flow crusher, a mortar or a crushing tank. To crush the metal compound into finer particles, an air flow crusher is preferably used. To facilitate the crushing in small amounts, the use of a mortar is preferable.

The electrocatalyst preferably has a BET specific surface area in the range of 1 to 1000 $m^2/g$, and more preferably 10 to 100 $m^2/g$. If the BET specific surface area is less than 1 $m^2/g$, the catalyst area is insufficient. If the BET specific surface area is in excess of 1000 $m^2/g$, the particles tend to aggregate and cause difficult handling.

The BET specific surface area in the invention may be measured with a commercially available BET adsorption apparatus. For example, Micromeritics Gemin±2360 manufactured by Shimadzu Corporation may be used.

The electrocatalyst preferably has an ionization potential in the range of 4.9 to 5.5 eV, more preferably 5.0 to 5.4 eV, and still more preferably 5.1 to 5.3 eV. This ionization potential ensures that the electrocatalyst shows high oxygen reduction activity. Although the details are unclear, the present inventors assume that the electrocatalyst having the above ionization potential achieves high oxygen reduction activity because the metal compound forming the electrocatalyst has an electronic state suited for oxygen reduction.

In the invention, the ionization potential is measured by a method as will be described in the working examples later.

As described above, the electrocatalyst is preferably powder to achieve a higher catalytic activity.

The particle diameter of the electrocatalyst powder may be determined from the BET specific surface area, based on the equation (1) below regarding the particles to be spherical.

$$D = 6/\rho S \qquad (1)$$

D: particle diameter (μm) of electrocatalyst powder
ρ: specific gravity ($g/cm^3$) of electrocatalyst powder
S: BET specific surface area ($m^2/g$) of electrocatalyst powder In a preferred embodiment, the electrocatalyst is a heat treated product of the metal compound.

The heat treatment may be performed to increase the crystallinity of the metal compound. The heat treatment also removes impurities by gasifying them through evaporation, sublimation, thermal decomposition or the like. Depending on the heat treatment temperature, the hydroxyl groups on the surface of particles and the material-derived alkoxyl groups or carboxylic acid groups may be released by the heat treatment, whereby metal compounds having more surface defects may be obtained. For example, the impurities removed by this treatment are hydrolysis by-products although variable depending on the kinds of the metal salts or the metal complexes. The heat treatment is usually performed at 400 to 1200° C. The heat treatment time may be determined appropriately depending on the kinds of the metal salts or the metal complexes as raw materials, the kinds of the metal compounds, the heat treatment temperature or the oxygen concentration. The heat treatment time is usually in the range of 10 minutes to 5 hours. The heat treatment time includes the temperature increasing time and the temperature decreasing time. The calcination atmosphere is not particularly limited, but is usually an air atmosphere, an inert gas atmosphere or a reduced pressure atmosphere. The higher the calcination temperature or the longer the calcination time, the higher the crystallinity of the obtainable metal compound but the smaller the specific surface area. Optimum conditions are determined balancing these factors.

Depending on the kinds of the metal compounds and the heat treatment temperature, the heat treatment can increase the valence of the metal element forming the electrocatalyst. When the metal is increased in valence, the metal tends to achieve a higher catalytic activity. For example, niobium dioxide as the metal compound may be heat treated at about 1000° C. into niobium pentoxide.

The electrocatalyst preferably has an oxygen reduction onset potential of not less than 0.4 V as measured versus a reversible hydrogen electrode (vs. NHE) by the measurement method (A) described below.

[Measurement Method (A)]

The electrocatalyst dispersed in electron conductive carbon particles is added to a solvent such that the electrocatalyst and the carbon particles account for 1 wt % relative to the solvent. The mixture is ultrasonically stirred to give a suspension. The carbon herein is carbon black (specific surface area: 100-300 $m^2/g$) (e.g., XC-72 manufactured by Cabot Corporation), and the electrocatalyst is dispersed therein with an electrocatalyst:carbon weight ratio of 95:5. The solvent is a mixture of isopropyl alcohol:water (=2:1 by weight).

While ultrasonicating the suspension, a 30 μL portion thereof is collected and is quickly dropped on a glassy carbon electrode (diameter: 5.2 mm).

After the dropping, the suspension is dried at 120° C. for 1 hour to form a layer containing the electrocatalyst on the glassy carbon electrode.

Subsequently, 10 μL of Nafion (a 5% Nafion solution (DE521) manufactured by Du Pont Kabushiki Kaisha) diluted ten times with pure water is dropped thereon and dried at 120° C. for 1 hour.

The electrode manufactured above is polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode is used in a sulfuric acid solution of the same concentration. In the current-potential curve, the potential at which the reduction current starts to differ by 0.2 μA/cm$^2$ or more between the polarization curve under the oxygen atmosphere and that under the nitrogen atmosphere is defined as the oxygen reduction onset potential.

If the oxygen reduction onset potential is less than 0.7 V (vs. NHE), the use of the electrocatalyst in a fuel cell cathode may cause the generation of hydrogen peroxide. For the oxygen reduction, the oxygen reduction onset potential is preferably 0.85 V (vs. NHE) or more. A higher oxygen reduction onset potential is more preferable. The upper limit thereof is not particularly limited but is theoretically 1.23 V (vs. NHE).

The catalyst layer of the invention that is formed of the above electrocatalyst is preferably used at a potential of not less than 0.4 V (vs. NHE) in an acidic electrolyte. The upper limit of the potential depends on the stability of the electrode. The electrocatalyst of the invention may be used at as high a potential as about 1.23 V (vs. NHE) which is the oxygen evolution potential.

At a potential of less than 0.4 V (vs. NHE), the metal compound can exist stably but oxygen cannot be reduced favorably. Catalyst layers having such a low potential are not useful in membrane electrode assemblies for fuel cells.

Preferably, the catalyst layer further contains electron conductive particles. When the catalyst layer containing the electrocatalyst further contains electron conductive particles, the reduction current may be increased because the electron conductive particles establish electrical contacts with the electrocatalyst to induce electrochemical reaction.

The electron conductive particles are generally used as a carrier for the electrocatalyst.

Examples of the electron conductive particles include carbons, conductive polymers, conductive ceramics, metals and conductive inorganic oxides such as tungsten oxide and iridium oxide. These electron conductive particles may be used singly or in combination with one another. In particular, carbon or a mixture of carbon and other electron conductive particles is preferable because carbon has a large specific surface area. When the catalyst layer contains the electrocatalyst and carbon, the reduction current may be further increased.

Examples of the carbons include carbon blacks, graphites, black leads, activated carbons, carbon nanotubes, carbon nanofibers, carbon nanohorns and fullerenes. If the particle diameter of carbon is excessively small, the carbon may not be able to form an electron conductive path. If the particle diameter is excessively large, the catalyst layer tends to reduce gas diffusion properties or the catalyst utilization tends to be lowered. The carbon particle diameter is preferably in the range of 10 to 1000 nm, and more preferably 10 to 100 nm.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

When the carbon is used as the electron conductive particles, the weight ratio of the electrocatalyst and the carbon (electrocatalyst:electron conductive particles) is preferably in the range of 80:20 to 1000:1.

In a usual embodiment, the catalyst layer further contains an electrolyte such as a polymer electrolyte or a conductive polymer.

The polymer electrolytes may be any polymer electrolytes generally used in catalyst layers without limitation. Specific examples include perfluorocarbon polymers having a sulfonic acid group (such as Nafion (a 5% Nafion solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, Nafion (a 5% Nafion solution (DE521) manufactured by Du Pont Kabushiki Kaisha) is preferable.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The catalyst layers according to the present invention contain the electrocatalyst which has high oxygen reduction activity and is resistant to corrosion in acidic electrolytes at high potential. Accordingly, the catalyst layers of the invention are suited for use in fuel cell cathodes (as cathode catalyst layers). In particular, the catalyst layers are suitably provided in cathodes of membrane electrode assemblies in polymer electrolyte fuel cells.

The electrocatalyst may be dispersed on the electron conductive particles as carriers by methods such as airborne dispersion methods and in-liquid dispersion methods. The in-liquid dispersion methods are preferable because the catalyst layer may be simply prepared from a dispersion of the electrocatalyst and the electron conductive particles in a solvent. Exemplary in-liquid dispersion methods include an orifice-choked flow method, a rotational shear flow method and an ultrasonic method. The solvents used in the in-liquid dispersion methods are not particularly limited as long as the electrocatalysts or the electron conductive particles are not corroded and are dispersed therein. Volatile liquid organic solvents and water are generally used.

When the electrocatalyst is dispersed on the electron conductive particles, the electrolyte and the dispersant described above may be dispersed together.

The catalyst layer may be formed by any methods without limitation. For example, a suspension containing the electrocatalyst, the electron conductive particles and the electrolyte may be applied to an electrolyte membrane or a gas diffusion layer as described later. The application methods include dipping, screen printing, roll coating and spraying. In another embodiment, a suspension containing the electrocatalyst, the electron conductive particles and the electrolyte may be applied or filtered on a substrate to form a catalyst layer, and the catalyst layer may be transferred to an electrolyte membrane.

[Use]

The membrane electrode assemblies of the invention have a cathode, an anode and an electrolyte membrane between the cathode and the anode. The cathode has the catalyst layer as described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

The cathode is usually composed of the catalyst layer described above and a gas diffusion layer.

The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used.

The fuel cells according to the present invention have the membrane electrode assemblies as described above.

The electrode reaction in fuel cells takes place at a three-phase boundary (electrolyte-electrocatalyst-reaction gas). The fuel cells are classified depending on the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies of the invention are suitably used in polymer electrolyte fuel cells.

EXAMPLES

The present invention will be described based on examples hereinbelow without limiting the scope of the invention.

Example 1

Production of Electrocatalyst

Titanium (IV) tetrabutoxide monomer (manufactured by Wako Pure Chemical Industries Ltd.) in an amount of 5.0 g was dissolved in 100 mL of ethanol (manufactured by Wako Pure Chemical Industries Ltd.). With stirring, 1.3 mL of deionized water was added dropwise. The stirring was continued for another one hour, and the liquid mixture was filtered under reduced pressure to give a solid. The solid was washed with 100 mL of deionized water and was filtered under reduced pressure. The washing and the filtration under reduced pressure were carried out five times.

The solid was placed in an alumina crucible and was dried at 120° C. for 1 hour. The resultant titanium (IV) oxide was heat treated in an electric furnace (desktop muffle furnace KDF P90 manufactured by DENKEN CO., LTD.) under a stream of air at 50 NL/min under the following conditions.

Temperature increasing rate: 20° C./min
Calcination temperature: 600° C.
Calcination time (retention time): 2 hours After the heat treatment, the calcined product was naturally cooled. As a result, 1.2 g of titanium (IV) oxide was obtained. The titanium (IV) oxide was sufficiently crushed in a mortar to give an electrocatalyst (1).

(Production of Fuel Cell Electrode)

The oxygen reduction activity was determined in the following manner. The electrocatalyst (1) in an amount of 0.095 g and carbon (XC-72 manufactured by Cabot Corporation) weighing 0.005 g were added to 10 g of a solution consisting of isopropyl alcohol:water=2:1 (weight ratio). The mixture was ultrasonically stirred to give a suspended mixture. The suspension in an amount of 30 μL was applied on a glassy carbon electrode (diameter: 5.2 mm) and was dried at 120° C. for 1 hour. Subsequently, 10 μl, of Nafion® (a 5% Nafion solution (DE521) manufactured by Du Pont Kabushiki Kaisha) diluted ten times with pure water was applied thereon and was dried at 120° C. for 1 hour. A fuel cell electrode (1) was thus manufactured.

(Evaluation of Oxygen Reduction Activity)

The fuel cell electrode (1) manufactured above was evaluated for catalytic activity (oxygen reduction activity) as described below.

The fuel cell electrode (1) was polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode was used in a sulfuric acid solution of the same concentration.

In the current-potential curve obtained, the potential at which the reduction current started to differ by 0.2 μA/cm$^2$ or more between the polarization curve under the oxygen atmosphere and that under the nitrogen atmosphere was defined as the oxygen reduction onset potential. The difference between the reduction currents was defined as the oxygen reduction current.

The catalytic activity (oxygen reduction activity) of the fuel cell electrode (1) was evaluated based on the oxygen reduction onset potential and the oxygen reduction current.

In detail, the higher the oxygen reduction onset potential and the higher the oxygen reduction current, the higher the catalytic activity (oxygen reduction activity) of the fuel cell electrode (1).

The current-potential curve recorded during the above measurement is shown in FIG. 1.

The fuel cell electrode (1) manufactured in Example 1 had an oxygen reduction onset potential of 0.8 V (vs. NHE) and was found to have high oxygen reduction activity.

(Ionization Potential)

The ionization potential of the electrocatalyst (1) was measured using photoelectron spectrometer MODEL AC-2 manufactured by RIKEN KEIKI Co., Ltd. The ionization potential obtained is set forth in Table 1. The measurement method is described below.

The electrocatalyst (1) was put and spread on a UV irradiation area of a sample table of the measurement apparatus using a spatula. Scanning was made while the UV excitation energy was raised starting from 4.5 eV to 5.7 eV under the following conditions. Some electrocatalysts did not show the photoelectron emission threshold at 4.5 to 5.7 eV. In such cases, scanning was made while raising the excitation energy from 3.4 eV minimum to 6.2 eV maximum.

Light energy: 500 nW
Counting time: 15 seconds
Scanning interval: 0.1 eV

The photoelectrons emitted by the excitation were measured, and a graph was made with the normalized photoelectron yield (Yield^n) on the vertical axis and the excitation energy (eV) on the horizontal axis. Herein, the normalized photoelectron yield (Yield^n) indicates a photoelectron yield per unit light energy, multiplied by the factor n. The factor n was 0.5. The excitation energy before the electron emission started, and that after the electron emission started were determined with the apparatus. The graph is set forth in FIG. 32.

The photoelectron emission threshold was obtained as the ionization potential from the graph. The ionization potential is shown in Table 1.

(X-Ray Diffractometry)

The Electrocatalyst (1) was Analyzed by X-Ray diffractometry using Rotor Flex manufactured by Rigaku Denki Co., Ltd. FIG. 2 shows an XRD spectrum of the sample. The electrocatalyst was identified to be anatase titanium oxide.

(Bet Specific Surface Area)

The BET specific surface area of the electrocatalyst (1) was measured using Micromeritics Gemini 2360 manufactured by Shimadzu Corporation.

The specific surface area of the electrocatalyst (1) was 7.3 $m^2/g$.

Example 2

Production of Electrocatalyst

Niobium (IV) 2-ethylhexanoate (manufactured by Wako Pure Chemical Industries Ltd.) in an amount of 5.0 g was dissolved in 100 mL of ethanol (manufactured by Wako Pure Chemical Industries Ltd.). With sufficient stirring, 11 mL of 25% tetramethylammonium hydroxide diluted five times with water was added with use of a dropping funnel at a rate of 0.2 mL/min. The stirring was continued for another 5 hours, and the liquid mixture was filtered under reduced pressure to give a solid. The solid was washed with 100 mL of deionized water and was filtered under reduced pressure. The washing and the filtration were carried out five times.

The solid was placed in an alumina crucible and was dried at 120° C. for 1 hour to afford 0.94 g of a hydrolyzate. The hydrolyzate was sufficiently crushed in a mortar to give an electrocatalyst (2).

(Production of Fuel Cell Electrode)

A fuel cell electrode (2) was produced in the same manner as in Example 1 except that the electrocatalyst (1) was replaced by the electrocatalyst (2).

(Evaluation of Oxygen Reduction Activity)

The oxygen reduction activity was evaluated in the same manner as in Example 1 except that the fuel cell electrode (1) was replaced by the fuel cell electrode (2).

The current-potential curve recorded during the measurement is shown in FIG. 3.

The fuel cell electrode (2) manufactured in Example 2 had an oxygen reduction onset potential of 0.9 V (vs. NHE) and was found to have high oxygen reduction activity.

(Ionization Potential)

The ionization potential was measured in the same manner as in Example 1 except that the electrocatalyst (1) was replaced by the electrocatalyst (2). The ionization potential is shown in Table 1.

(X-Ray Diffractometry)

The X-Ray Diffractometry was Performed in the Same Manner as in Example 1 except that the electrocatalyst (1) was replaced by the electrocatalyst (2). The electrocatalyst was amorphous and could not be identified.

Because the reaction was hydrolysis reaction and based on the yield of the hydrolyzate, the product was assumed to be niobium (IV) hydroxide.

(Bet Specific Surface Area)

The BET specific surface area was measured in the same manner as in Example 1 except that the electrocatalyst (1) was replaced by the electrocatalyst (2).

The specific surface area of the electrocatalyst (2) was 21 $m^2/g$.

Example 3

The electrocatalyst (2) from Example 2 was heat treated in an electric furnace (desktop muffle furnace KDF P90 manufactured by DENKEN CO., LTD.) under a stream of air at 50 NL/min under the following conditions.

Temperature increasing rate: 20° C./min

Calcination temperature: 1000° C.

Calcination time: 2 hours

After the heat treatment, the calcined product was naturally cooled. As a result, 1.0 g of niobium (V) pentoxide was obtained. The niobium (V) pentoxide was sufficiently crushed in a mortar to give an electrocatalyst (3).

(Production of Fuel Cell Electrode)

A fuel cell electrode (3) was produced in the same manner as in Example 1 except that the electrocatalyst (1) was replaced by the electrocatalyst (3).

(Evaluation of Oxygen Reduction Activity)

The oxygen reduction activity was evaluated in the same manner as in Example 1 except that the fuel cell electrode (1) was replaced by the fuel cell electrode (3).

The current-potential curve recorded during the measurement is shown in FIG. 4.

The fuel cell electrode (3) manufactured in Example 3 had an oxygen reduction onset potential of 1.0 V (vs. NHE) and was found to have high oxygen reduction activity.

(Ionization Potential)

The ionization potential was measured in the same manner as in Example 1 except that the electrocatalyst (1) was replaced by the electrocatalyst (3). The ionization potential is shown in Table 1.

(X-Ray Diffractometry)

The X-Ray Diffractometry was Performed in the Same Manner as in Example 1 except that the electrocatalyst (1) was replaced by the electrocatalyst (3). FIG. 5 shows an XRD spectrum of the sample. The electrocatalyst was identified to be monoclinic niobium (V) pentoxide.

(Bet Specific Surface Area)

The BET specific surface area was measured in the same manner as in Example 1 except that the electrocatalyst (1) was replaced by the electrocatalyst (3).

The specific surface area of the electrocatalyst (3) was 4.6 $m^2/g$.

Example 4

The electrocatalyst (2) from Example 2 was heat treated in an electric furnace (desktop muffle furnace KDF P90 manufactured by DENKEN CO., LTD.) under a stream of air at 50 NL/min under the following conditions.

Temperature increasing rate: 20° C./min

Calcination temperature: 800° C.

Calcination time: 2 hours

After the heat treatment, the calcined product was naturally cooled. As a result, 1.0 g of niobium oxide was obtained. The niobium (V) pentoxide was sufficiently crushed in a mortar to give an electrocatalyst (4).

(Production of Fuel Cell Electrode)

A fuel cell electrode (4) was produced in the same manner as in Example 1 except that the electrocatalyst (1) was replaced by the electrocatalyst (4).

(Evaluation of Oxygen Reduction Activity)

The oxygen reduction activity was evaluated in the same manner as in Example 1 except that the fuel cell electrode (1) was replaced by the fuel cell electrode (4).

The current-potential curve recorded during the measurement is shown in FIG. 6.

The fuel cell electrode (4) manufactured in Example 4 had an oxygen reduction onset potential of 0.9 V (vs. NHE) and was found to have high oxygen reduction activity.

(Ionization Potential)

The ionization potential was measured in the same manner as in Example 1 except that the electrocatalyst (1) was replaced by the electrocatalyst (4). The ionization potential is shown in Table 1.

(X-Ray Diffractometry)

The X-Ray Diffractometry was Performed in the Same Manner as in Example 1 except that the electrocatalyst (1) was replaced by the electrocatalyst (4). FIG. 7 shows an XRD spectrum of the sample. The electrocatalyst was identified to be orthorhombic niobium oxide.

(Bet Specific Surface Area)

The BET specific surface area was measured in the same manner as in Example 1 except that the electrocatalyst (1) was replaced by the electrocatalyst (4).

The specific surface area of the electrocatalyst (4) was 5.8 $m^2/g$.

Example 5

The electrocatalyst (2) from Example 2 was heat treated in an electric furnace (desktop muffle furnace KDF P90 manufactured by DENKEN CO., LTD.) under a stream of air at 50 NL/min under the following conditions.

Temperature increasing rate: 20° C./min
Calcination temperature: 600° C.
Calcination time: 2 hours After the heat treatment, the calcined product was naturally cooled. As a result, 1.0 g of niobium (V) pentoxide was obtained. The niobium oxide was sufficiently crushed in a mortar to give an electrocatalyst (4).

(Production of Fuel Cell Electrode)

A fuel cell electrode (5) was produced in the same manner as in Example 1 except that the electrocatalyst (1) was replaced by the electrocatalyst (5).

(Evaluation of Oxygen Reduction Activity)

The oxygen reduction activity was evaluated in the same manner as in Example 1 except that the fuel cell electrode (1) was replaced by the fuel cell electrode (5).

The current-potential curve recorded during the measurement is shown in FIG. 8.

The fuel cell electrode (5) manufactured in Example 5 had an oxygen reduction onset potential of 0.8 V (vs. NHE) and was found to have high oxygen reduction activity.

(Ionization Potential)

The ionization potential was measured in the same manner as in Example 1 except that the electrocatalyst (1) was replaced by the electrocatalyst (5). The ionization potential is shown in Table 1.

(X-Ray Diffractometry)

The X-Ray Diffractometry was Performed in the Same Manner as in Example 1 except that the electrocatalyst (1) was replaced by the electrocatalyst (5). FIG. 9 shows an XRD spectrum of the sample. The electrocatalyst was identified to be orthorhombic niobium oxide.

(Bet Specific Surface Area)

The BET specific surface area was measured in the same manner as in Example 1 except that the electrocatalyst (1) was replaced by the electrocatalyst (5).

The specific surface area of the electrocatalyst (5) was 31.4 $m^2/g$.

Example 6

Production of Electrocatalyst

A 85% zirconium (IV) butoxide 1-butanol solution (manufactured by Wako Pure Chemical Industries Ltd.) in an amount of 5.0 g was dissolved in 20 mL of ethanol (manufactured by Wako Pure Chemical Industries Ltd.). With sufficient stirring, 0.96 mL of water was added with a dropping funnel at a rate of 0.2 mL/min. The stirring was continued for another one hour, and the liquid mixture was filtered under reduced pressure to give a solid. The solid was washed with 100 mL of deionized water and was filtered under reduced pressure. The washing and the filtration were carried out five times.

The solid was placed in an alumina crucible and was dried at 120° C. for 1 hour to give a hydrolyzate. The hydrolyzate was sufficiently crushed in a mortar and was heat treated in an electric furnace (desktop muffle furnace KDF P90 manufactured by DENKEN CO., LTD.) under a stream of air at 50 NL/min under the following conditions.

Temperature increasing rate: 20° C./min
Calcination temperature: 1000° C.
Calcination time (retention time): 2 hours After the heat treatment, the calcined product was naturally cooled. As a result, 1.3 g of zirconium (IV) oxide was obtained. The zirconium oxide was sufficiently crushed in a mortar to give an electrocatalyst (6).

(Evaluation of Oxygen Reduction Activity)

The oxygen reduction activity was evaluated in the same manner as in Example 1 except that the fuel cell electrode (1) was replaced by the fuel cell electrode (6).

The current-potential curve recorded during the measurement is shown in FIG. 10.

The fuel cell electrode (6) manufactured in Example 6 had an oxygen reduction onset potential of 0.8 V (vs. NHE) and was found to have high oxygen reduction activity.

(Ionization Potential)

The ionization potential was measured in the same manner as in Example 1 except that the electrocatalyst (1) was replaced by the electrocatalyst (6). The ionization potential is shown in Table 1.

(X-Ray Diffractometry)

The X-Ray Diffractometry was Performed in the Same Manner as in Example 1 except that the electrocatalyst (1) was replaced by the electrocatalyst (6). FIG. 11 shows an XRD spectrum of the sample. The electrocatalyst was identified to be monoclinic zirconium oxide.

(Bet Specific Surface Area)

The BET specific surface area was measured in the same manner as in Example 1 except that the electrocatalyst (1) was replaced by the electrocatalyst (6).

The specific surface area of the electrocatalyst (6) was 6.7 $m^2/g$.

Example 7

Production of Electrocatalyst

Niobium (V) ethoxide (manufactured by Wako Pure Chemical Industries Ltd.) in an amount of 5.0 g was dissolved in 30 mL of ethanol (manufactured by Wako Pure Chemical Industries Ltd.). With sufficient stirring, 1.5 mL of water was added with a dropping funnel at a rate of 0.1 mL/min. The stirring was continued for another one hour, and the liquid mixture was filtered under reduced pressure to give a solid. The solid was washed with 100 mL of deionized water and was filtered under reduced pressure. The washing and the filtration were carried out five times.

The solid was placed in an alumina crucible and was dried at 120° C. for 1 hour to give a hydrolyzate. The hydrolyzate was sufficiently crushed in a mortar and was heat treated in an electric furnace (desktop muffle furnace KDF P90 manufactured by DENKEN CO., LTD.) under a stream of air at 50 NL/min under the following conditions.

Temperature increasing rate: 20° C./min
Calcination temperature: 800° C.
Calcination time (retention time): 2 hours After the heat treatment, the calcined product was naturally cooled. As a result, 2.1 g of niobium (V) pentoxide was obtained. The niobium oxide was sufficiently crushed in a mortar to give an electrocatalyst (7).

(Evaluation of Oxygen Reduction Activity)

The oxygen reduction activity was evaluated in the same manner as in Example 1 except that the fuel cell electrode (1) was replaced by the fuel cell electrode (7).

The current-potential curve recorded during the measurement is shown in FIG. 12.

The fuel cell electrode (7) manufactured in Example 7 had an oxygen reduction onset potential of 0.8 V (vs. NHE) and was found to have high oxygen reduction activity.

(Ionization Potential)

The ionization potential was measured in the same manner as in Example 1 except that the electrocatalyst (1) was replaced by the electrocatalyst (7). The ionization potential is shown in Table 1.

(X-Ray Diffractometry)

The X-Ray Diffractometry was Performed in the Same Manner as in Example 1 except that the electrocatalyst (1) was replaced by the electrocatalyst (7). FIG. 13 shows an XRD spectrum of the sample. The electrocatalyst was identified to be monoclinic niobium oxide.

(Bet Specific Surface Area)

The BET specific surface area was measured in the same manner as in Example 1 except that the electrocatalyst (1) was replaced by the electrocatalyst (7).

The specific surface area of the electrocatalyst (7) was 6.3 m$^2$/g.

Example 8

Production of Electrocatalyst

Niobium pentachloride (NbCl$_5$) (manufactured by Wako Pure Chemical Industries Ltd.) in an amount of 5.0 g was dissolved in 50 mL of ethanol (manufactured by Wako Pure Chemical Industries Ltd.). With sufficient stirring, 93 mL of a 1 mol/L NaOH solution was added with a dropping funnel at a rate of 0.1 mL/min. The stirring was continued for another one hour, and the liquid mixture was filtered under reduced pressure to give a solid. The solid was washed with 100 mL of deionized water and was filtered under reduced pressure. The washing and the filtration were carried out five times.

The solid was placed in an alumina crucible and was dried at 120° C. for 1 hour to give a hydrolyzate. The hydrolyzate was sufficiently crushed in a mortar and was heat treated in an electric furnace (desktop muffle furnace KDF P90 manufactured by DENKEN CO., LTD.) under a stream of air at 50 NL/min under the following conditions.

Temperature increasing rate: 20° C./min
Calcination temperature: 800° C.
Calcination time (retention time): 2 hours After the heat treatment, the calcined product was naturally cooled. As a result, 2.4 g of niobium oxide was obtained. The niobium oxide was sufficiently crushed in a mortar to give an electrocatalyst (8).

(Evaluation of Oxygen Reduction Activity)

The oxygen reduction activity was evaluated in the same manner as in Example 1 except that the fuel cell electrode (1) was replaced by the fuel cell electrode (8).

The current-potential curve recorded during the measurement is shown in FIG. 14.

The fuel cell electrode (8) manufactured in Example 8 had an oxygen reduction onset potential of 0.9 V (vs. NHE) and was found to have high oxygen reduction activity.

(Ionization Potential)

The ionization potential was measured in the same manner as in Example 1 except that the electrocatalyst (1) was replaced by the electrocatalyst (8). The ionization potential is shown in Table 1.

(X-Ray Diffractometry)

The X-Ray Diffractometry was Performed in the Same Manner as in Example 1 except that the electrocatalyst (1) was replaced by the electrocatalyst (8). FIG. 15 shows an XRD spectrum of the sample. The electrocatalyst was identified to be monoclinic niobium oxide.

(Bet Specific Surface Area)

The BET specific surface area was measured in the same manner as in Example 1 except that the electrocatalyst (1) was replaced by the electrocatalyst (8).

The specific surface area of the electrocatalyst (8) was 8.5 m$^2$/g.

Example 9

Production of Electrocatalyst

Niobium pentachloride (NbCl$_5$) (manufactured by Wako Pure Chemical Industries Ltd.) in an amount of 5.0 g was dissolved in 50 mL of ethanol (manufactured by Wako Pure Chemical Industries Ltd.). With sufficient stirring, 93 mL of a 1 mol/L NaOH solution was added with a dropping funnel at a rate of 0.1 mL/min. The stirring was continued for another one hour, and the liquid mixture was filtered under reduced pressure to give a solid. The solid was washed with 100 mL of deionized water and was filtered under reduced pressure. The washing and the filtration were carried out five times.

The solid was placed in an alumina crucible and was dried at 120° C. for 1 hour to give a hydrolyzate. The hydrolyzate was sufficiently crushed in a mortar and was heat treated in an electric furnace (desktop muffle furnace KDF P90 manufactured by DENKEN CO., LTD.) under a stream of air at 50 NL/min under the following conditions.

Temperature increasing rate: 20° C./min
Calcination temperature: 600° C.
Calcination time (retention time): 2 hours After the heat treatment, the calcined product was naturally cooled. As a result, 2.4 g of niobium oxide was obtained. The niobium oxide was sufficiently crushed in a mortar to give an electrocatalyst (9).

(Evaluation of Oxygen Reduction Activity)

The oxygen reduction activity was evaluated in the same manner as in Example 1 except that the fuel cell electrode (1) was replaced by the fuel cell electrode (9).

The current-potential curve recorded during the measurement is shown in FIG. 16.

The fuel cell electrode (9) manufactured in Example 9 had an oxygen reduction onset potential of 0.8 V (vs. NHE) and was found to have high oxygen reduction activity.

(Ionization Potential)

The ionization potential was measured in the same manner as in Example 1 except that the electrocatalyst (1) was replaced by the electrocatalyst (9). The ionization potential is shown in Table 1.

(X-Ray Diffractometry)

The X-Ray Diffractometry was Performed in the Same Manner as in Example 1 except that the electrocatalyst (1) was replaced by the electrocatalyst (9). FIG. 17 shows an XRD spectrum of the sample. The electrocatalyst was identified to be orthorhombic niobium oxide.

(Bet Specific Surface Area)

The BET specific surface area was measured in the same manner as in Example 1 except that the electrocatalyst (1) was replaced by the electrocatalyst (9).

The specific surface area of the electrocatalyst (9) was 26 $m^2/g$.

Comparative Example 1

Production of Electrode

An electrode was produced in the same manner as in Example 1 except that the electrocatalyst (1) was replaced by niobium pentoxide ($Nb_2O_5$) powder (purity: 99.9%, manufactured by Kojundo Chemical Lab. Co., Ltd.).

(Evaluation of Oxygen Reduction Activity)

The oxygen reduction activity was evaluated in the same manner as in Example 1.

The current-potential curve recorded during the measurement is shown in FIG. 18.

The electrode had an oxygen reduction onset potential of 0.3 V (vs. NHE) and was found to have low oxygen reduction activity.

(Ionization Potential)

The ionization potential of the niobium pentoxide ($Nb_2O_5$) powder (purity: 99.9%, manufactured by Kojundo Chemical Lab. Co., Ltd.) was measured in the same manner as in Example 1. The ionization potential is shown in Table 1.

(X-Ray Diffractometry)

The X-Ray Diffractometry of the Niobium Pentoxide ($Nb_2O_5$) powder (purity: 99.9%, manufactured by Kojundo Chemical Lab. Co., Ltd.) was performed in the same manner as in Example 1.

FIG. 19 shows an XRD spectrum of the diniobium pentoxide powder (purity: 99.9%, manufactured by Kojundo Chemical Lab. Co., Ltd.).

The diniobium pentoxide powder (purity: 99.9%, manufactured by Kojundo Chemical Lab. Co., Ltd.) was identified to be orthorhombic.

(Bet Specific Surface Area)

The BET specific surface area of the niobium pentoxide ($Nb_2O_5$) powder was measured in the same manner as in Example 1.

The BET specific surface area of the niobium pentoxide ($Nb_2O_5$) powder was 5.5 $m^2/g$.

Comparative Example 2

Production of Electrode

An electrode was produced in the same manner as in Example 1 except that the electrocatalyst (1) was replaced by titanium oxide ($TiO_2$) powder (SUPER-TITANIA F1 manufactured by SHOWA DENKO K.K.).

(Evaluation of Oxygen Reduction Activity)

The oxygen reduction activity was evaluated in the same manner as in Example 1.

The current-potential curve recorded during the measurement is shown in FIG. 20.

The electrode had an oxygen reduction onset potential of 0.3 V (vs. NHE) and was found to have low oxygen reduction activity.

(Ionization Potential)

The ionization potential of the titanium oxide ($TiO_2$) powder (SUPER-TITANIA F1 manufactured by SHOWA DENKO K.K.) was measured in the same manner as in Example 1. The ionization potential is shown in Table 1.

(X-Ray Diffractometry)

The X-Ray Diffractometry of the Titanium Oxide ($TiO_2$) powder (SUPER-TITANIA F1 manufactured by SHOWA DENKO K.K.) was performed in the same manner as in Example 1.

FIG. 21 shows an XRD spectrum of the titanium oxide ($TiO_2$) powder (SUPER-TITANIA F1 manufactured by SHOWA DENKO K.K.).

The titanium oxide ($TiO_2$) powder (SUPER-TITANIA F1 manufactured by SHOWA DENKO K.K.) was identified to be a mixture of anatase titanium oxide and rutile titanium oxide.

(Bet Specific Surface Area)

The BET specific surface area of the titanium oxide ($TiO_2$) powder was measured in the same manner as in Example 1.

The BET specific surface area of the titanium oxide ($TiO_2$) powder was 21 $m^2/g$.

Comparative Example 3

Production of Metal Oxide

A titanium tetrachloride ($TiCl_4$) solution (manufactured by Wako Pure Chemical Industries Ltd.) in an amount of 5.0 g was placed in an alumina crucible and was heat treated in an electric furnace (desktop muffle furnace KDF P90 manufactured by DENKEN CO., LTD.) under a stream of $N_2$ at 50 NL/min under the following conditions.

Temperature increasing rate: 20° C./min
Calcination temperature: 600° C.
Calcination time: 2 hours After the heat treatment, the calcined product was naturally cooled. As a result, 1.6 g of titanium oxide was obtained. The titanium oxide was sufficiently crushed in a mortar to give a metal oxide electrocatalyst.

(Evaluation of Oxygen Reduction Activity)

The oxygen reduction activity was evaluated in the same manner as in Example 1.

The current-potential curve recorded during the measurement is shown in FIG. 22.

The electrode had an oxygen reduction onset potential of 0.3 V (vs. NHE) and was found to have low oxygen reduction activity.

(Ionization Potential)

The ionization potential of the titanium oxide was measured in the same manner as in Example 1. The ionization potential is shown in Table 1.

(X-Ray Diffractometry)

The X-Ray Diffractometry of the Titanium Oxide was performed in the same manner as in Example 1.

FIG. 23 shows an XRD spectrum of the titanium oxide.

The titanium oxide was identified to be rutile titanium oxide.

(Bet Specific Surface Area)

The BET specific surface area of the titanium oxide powder was measured in the same manner as in Example 1.

The BET specific surface area of the titanium oxide powder was 9.7 m²/g.

Comparative Example 4

Production of Metal Oxide

The procedures in Comparative Example 3 were repeated except that 5.0 g of the titanium tetrachloride (TiCl$_4$) solution (manufactured by Wako Pure Chemical Industries Ltd.) was replaced by 5.0 g of niobium pentachloride (NbCl$_5$) (manufactured by Wako Pure Chemical Industries Ltd.) and that the calcination temperature was changed from 600° C. to 1000° C., thereby obtaining 2.4 g of niobium oxide. The niobium oxide was crushed in a mortar.

(Production of Electrode)

An electrode was produced in the same manner as in Example 1 except that the metal oxide electrocatalyst (1) was replaced by the crushed niobium oxide.

(Evaluation of Oxygen Reduction Activity)

The oxygen reduction activity was evaluated in the same manner as in Example 1.

The current-potential curve recorded during the measurement is shown in FIG. 24.

The electrode had an oxygen reduction onset potential of 0.3 V (vs. NHE) and was found to have low oxygen reduction activity.

(Ionization Potential)

The ionization potential of the niobium oxide was measured in the same manner as in Example 1. The ionization potential is shown in Table 1.

(X-Ray Diffractometry)

The X-Ray Diffractometry of the Niobium Oxide was performed in the same manner as in Example 1.

FIG. 25 shows an XRD spectrum of the niobium oxide.

The niobium oxide was identified to be monoclinic niobium oxide.

(Bet Specific Surface Area)

The BET specific surface area of the niobium oxide powder was measured in the same manner as in Example 1.

The BET specific surface area of the niobium oxide powder was 1.9 m²/g.

Comparative Example 5

Production of Metal Oxide

The procedures in Comparative Example 3 were repeated except that 5.0 g of the titanium tetrachloride (TiCl$_4$) solution (manufactured by Wako Pure Chemical Industries Ltd.) was replaced by 5.0 g of niobium pentachloride (NbCl$_5$) (manufactured by Wako Pure Chemical Industries Ltd.) and that the calcination temperature was changed from 600° C. to 800° C., thereby obtaining 2.4 g of niobium oxide. The niobium oxide was crushed in a mortar.

(Production of Electrode)

An electrode was produced in the same manner as in Example 1 except that the metal oxide electrocatalyst (1) was replaced by the crushed niobium oxide.

(Evaluation of Oxygen Reduction Activity)

The oxygen reduction activity was evaluated in the same manner as in Example 1.

The current-potential curve recorded during the measurement is shown in FIG. 26.

The electrode had an oxygen reduction onset potential of 0.3 V (vs. NHE) and was found to have low oxygen reduction activity.

(Ionization Potential)

The ionization potential of the niobium oxide was measured in the same manner as in Example 1. The ionization potential is shown in Table 1.

(X-Ray Diffractometry)

The X-Ray Diffractometry of the Niobium Oxide was performed in the same manner as in Example 1.

FIG. 27 shows an XRD spectrum of the niobium oxide.

The niobium oxide was identified to be orthorhombic niobium oxide.

(Bet Specific Surface Area)

The BET specific surface area of the niobium oxide powder was measured in the same manner as in Example 1.

The BET specific surface area of the niobium oxide powder was 2.9 m²/g.

Comparative Example 6

Production of Metal Oxide

The procedures in Comparative Example 3 were repeated except that 5.0 g of the titanium tetrachloride (TiCl$_4$) solution (manufactured by Wako Pure Chemical Industries Ltd.) was replaced by 5.0 g of niobium pentachloride (NbCl$_5$) (manufactured by Wako Pure Chemical Industries Ltd.), thereby obtaining 2.4 g of niobium oxide. The niobium oxide was crushed in a mortar.

(Production of Electrode)

An electrode was produced in the same manner as in Example 1 except that the metal oxide electrocatalyst (1) was replaced by the crushed niobium oxide.

(Evaluation of Oxygen Reduction Activity)

The oxygen reduction activity was evaluated in the same manner as in Example 1.

The current-potential curve recorded during the measurement is shown in FIG. 28.

The electrode had an oxygen reduction onset potential of 0.3 V (vs. NHE) and was found to have low oxygen reduction activity.

(Ionization Potential)

The ionization potential of the niobium oxide was measured in the same manner as in Example 1. The ionization potential is shown in Table 1.

(X-Ray Diffractometry)

The X-Ray Diffractometry of the Niobium Oxide was performed in the same manner as in Example 1.

FIG. 29 shows an XRD spectrum of the niobium oxide.

The niobium oxide was identified to be a mixture of orthorhombic niobium oxide and monoclinic niobium oxide.

(Bet Specific Surface Area)

The BET specific surface area of the niobium oxide powder was measured in the same manner as in Example 1.

The BET specific surface area of the niobium oxide powder was 5.1 m²/g.

Comparative Example 7

Production of Metal Oxide

The procedures in Comparative Example 3 were repeated except that 5.0 g of the titanium tetrachloride (TiCl$_4$) solution (manufactured by Wako Pure Chemical Industries Ltd.) was replaced by 5.0 g of zirconium tetrachloride (ZrCl$_4$) (manufactured by Wako Pure Chemical Industries Ltd.) and that the calcination temperature was changed from 600° C. to 1000° C., thereby obtaining 2.6 g of zirconium oxide. The zirconium oxide was crushed in a mortar.

(Production of Electrode)

An electrode was produced in the same manner as in Example 1 except that the metal oxide electrocatalyst (1) was replaced by the crushed zirconium oxide.

(Evaluation of Oxygen Reduction Activity)

The oxygen reduction activity was evaluated in the same manner as in Example 1.

The current-potential curve recorded during the measurement is shown in FIG. 30.

The electrode had an oxygen reduction onset potential of 0.3 V (vs. NHE) and was found to have low oxygen reduction activity.

(Ionization Potential)

The ionization potential of the zirconium oxide was measured in the same manner as in Example 1. The ionization potential is shown in Table 1.

(X-Ray Diffractometry)

The X-Ray Diffractometry of the Zirconium Oxide was performed in the same manner as in Example 1.

FIG. 31 shows an XRD spectrum of the zirconium oxide.

The zirconium oxide was identified to be monoclinic zirconium oxide.

(Bet Specific Surface Area)

The BET specific surface area of the zirconium oxide powder was measured in the same manner as in Example 1.

The BET specific surface area of the zirconium oxide powder was 1.6 m²/g.

TABLE 1

|  | Ionization potential (eV) |
|---|---|
| Electrocatalyst of Example 1 | 5.26 |
| Electrocatalyst of Example 2 | 5.12 |
| Electrocatalyst of Example 3 | 5.19 |
| Electrocatalyst of Example 4 | 5.21 |
| Electrocatalyst of Example 5 | 5.13 |
| Electrocatalyst of Example 6 | 5.23 |
| Electrocatalyst of Example 7 | 5.20 |
| Electrocatalyst of Example 8 | 5.19 |
| Electrocatalyst of Example 9 | 5.23 |
| Electrocatalyst of Comparative Example 1 | 5.76 |
| Electrocatalyst of Comparative Example 2 | 5.80 |
| Electrocatalyst of Comparative Example 3 | 5.86 |
| Electrocatalyst of Comparative Example 4 | 5.81 |

TABLE 1-continued

|  | Ionization potential (eV) |
|---|---|
| Electrocatalyst of Comparative Example 5 | 5.68 |
| Electrocatalyst of Comparative Example 6 | 5.70 |
| Electrocatalyst of Comparative Example 7 | 5.67 |

The invention claimed is:

1. A catalyst layer comprising an electrocatalyst, the electrocatalyst comprising a metal compound obtained by hydrolyzing a metal salt or a metal complex, wherein the electrocatalyst has an ionization potential in the range of 4.9 to 5.5 eV.

2. The catalyst layer according to claim 1, wherein the metal element forming the electrocatalyst is one selected from the group consisting of niobium, titanium, tantalum and zirconium.

3. The catalyst layer according to claim 1, wherein the metal element forming the electrocatalyst is niobium or titanium.

4. The catalyst layer according to claim 1, wherein the electrocatalyst is powder.

5. The catalyst layer according to claim 1, wherein the metal salt is one selected from the group consisting of metal alkoxides, metal carboxylates and metal halides.

6. The catalyst layer according to claim 1, wherein the electrocatalyst has a BET specific surface area in the range of 1 to 1000 m²/g.

7. The catalyst layer according to claim 1, wherein the electrocatalyst is obtained by crushing the metal compound.

8. The catalyst layer according to claim 1, wherein the electrocatalyst is obtained by heat treating the metal compound.

9. The catalyst layer according to claim 8, wherein the heat treatment temperature in the heat treatment is in the range of 400 to 1200° C.

10. The catalyst layer according to claim 1, which further comprises electron conductive particles.

11. A membrane electrode assembly comprising a cathode, an anode and an electrolyte membrane arranged between the cathode and the anode, wherein the cathode has the catalyst layer described in claim 1.

12. A fuel cell comprising the membrane electrode assembly described in claim 11.

13. The fuel cell according to claim 12, which is a polymer electrolyte fuel cell.

* * * * *